(12) United States Patent
Hsueh et al.

(10) Patent No.: US 11,640,046 B2
(45) Date of Patent: May 2, 2023

(54) LENS SYSTEM AND ELECTRONIC DEVICE

(71) Applicant: LARGAN PRECISION CO., LTD., Taichung (TW)

(72) Inventors: Chun-Che Hsueh, Taichung (TW); Hsin-Hsuan Huang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 0 days.

(21) Appl. No.: 17/713,986

(22) Filed: Apr. 5, 2022

(65) Prior Publication Data

US 2022/0236527 A1 Jul. 28, 2022

Related U.S. Application Data

(63) Continuation of application No. 16/734,134, filed on Jan. 3, 2020, now Pat. No. 11,327,277.

(30) Foreign Application Priority Data

Nov. 29, 2019 (TW) ................................ 108143778

(51) Int. Cl.
*G02B 9/34* (2006.01)
*G02B 13/00* (2006.01)
*G06V 40/13* (2022.01)

(52) U.S. Cl.
CPC ............. *G02B 13/004* (2013.01); *G02B 9/34* (2013.01); *G06V 40/13* (2022.01)

(58) Field of Classification Search
None
See application file for complete search history.

(56) References Cited

U.S. PATENT DOCUMENTS

| 4,429,978 A | 2/1984 | Ikari |
| 4,999,007 A | 3/1991 | Aoki et al. |
| 5,052,787 A | 10/1991 | Sugawara |
| 5,175,650 A | 12/1992 | Takayama et al. |
| 5,251,073 A | 10/1993 | Schauss |
| 6,057,971 A | 5/2000 | Mihara |

(Continued)

FOREIGN PATENT DOCUMENTS

| CN | 101320124 A | 12/2008 |
| CN | 102213821 A | 10/2011 |

(Continued)

OTHER PUBLICATIONS

TW Office Action in Application No. 108143778 dated Dec. 4, 2020.

*Primary Examiner* — Joseph P Martinez
(74) *Attorney, Agent, or Firm* — Maschoff Brennan

(57) ABSTRACT

A lens system includes four lens elements which are, in order from an object side to an image side: a first lens element, a second lens element, a third lens element and a fourth lens element. Each of the four lens elements has an object-side surface facing toward the object side and an image-side surface facing toward the image side. At least one of the object-side surface and the image-side surface of the first lens element has at least one inflection point. The fourth lens element has positive refractive power, the object-side surface of the fourth lens element is convex in a paraxial region thereof, and at least one of the object-side surface and the image-side surface of the fourth lens element has at least one inflection point.

23 Claims, 31 Drawing Sheets

(56) References Cited

U.S. PATENT DOCUMENTS

| | | |
|---|---|---|
| 8,014,080 B1 | 9/2011 | Chen et al. |
| 8,089,698 B1 | 1/2012 | Tang et al. |
| 8,179,616 B1 | 5/2012 | Hsu et al. |
| 8,432,622 B2 | 4/2013 | Huang et al. |
| 8,441,745 B2 | 5/2013 | Tang et al. |
| 9,354,425 B2 | 5/2016 | Lin et al. |
| 9,442,276 B2 | 9/2016 | Tsai et al. |
| 9,507,124 B2 | 11/2016 | Huang et al. |
| 9,784,945 B1 | 10/2017 | Liao et al. |
| 9,857,557 B1 | 1/2018 | Bone et al. |
| 10,488,618 B2 | 11/2019 | Bone et al. |
| 10,634,873 B2 | 4/2020 | Chen et al. |
| 10,768,394 B2 | 9/2020 | Chen et al. |
| 11,237,362 B2 | 2/2022 | Lin et al. |
| 2014/0153116 A1 | 6/2014 | Kubota et al. |
| 2015/0177488 A1 | 6/2015 | Kubota et al. |
| 2016/0116712 A1 | 4/2016 | Liu et al. |
| 2017/0017060 A1 | 1/2017 | Liu et al. |
| 2017/0017061 A1 | 1/2017 | Liu et al. |
| 2017/0102519 A1 | 4/2017 | Kubota et al. |
| 2017/0307844 A1 | 10/2017 | Lai et al. |
| 2017/0307845 A1 | 10/2017 | Lai et al. |
| 2017/0315326 A1 | 11/2017 | Lai et al. |
| 2017/0315327 A1 | 11/2017 | Lai et al. |
| 2017/0351062 A1 | 12/2017 | Lai et al. |
| 2017/0351063 A1 | 12/2017 | Lai et al. |
| 2018/0011286 A1 | 1/2018 | Bone et al. |
| 2018/0011289 A1 | 1/2018 | Bone et al. |
| 2018/0011290 A1 | 1/2018 | Bone et al. |
| 2019/0107689 A1* | 4/2019 | Huang ................ G02B 13/004 |
| 2019/0121127 A1 | 4/2019 | Jia |
| 2019/0204570 A1 | 7/2019 | Song et al. |

FOREIGN PATENT DOCUMENTS

| | | |
|---|---|---|
| CN | 202093231 U | 12/2011 |
| CN | 206757158 U | 12/2017 |
| CN | 206757159 U | 12/2017 |
| CN | 110221412 A | 9/2019 |
| CN | 110346914 A | 10/2019 |
| CN | 209961994 A | 1/2020 |
| JP | S64-44412 A | 2/1989 |
| JP | H02-208617 A | 8/1990 |
| JP | H04-238312 A | 8/1992 |
| JP | H05-173067 A | 7/1993 |
| JP | H11-95096 A | 4/1999 |
| JP | 2007-279547 A | 10/2007 |
| JP | 2007-279548 A | 10/2007 |
| JP | 2008-191230 A | 8/2008 |
| JP | 2008-191231 A | 8/2008 |
| JP | 2013-109052 A | 6/2013 |
| JP | 2014-106521 A | 6/2014 |
| JP | 2014-232283 A | 12/2014 |
| JP | 2015-034885 A | 2/2015 |
| TW | 201805678 A | 2/2018 |
| WO | 2013/015082 A1 | 1/2013 |
| WO | 2020238495 A1 | 12/2020 |

\* cited by examiner

LENS SYSTEM AND ELECTRONIC DEVICE

RELATED APPLICATIONS

This application is a continuation patent application of U.S. application Ser. No. 16/734,134, filed on Jan. 3, 2020, which claims priority to Taiwan Application 108143778, filed on Nov. 29, 2019, which is incorporated by reference herein in its entirety.

BACKGROUND

Technical Field

The present disclosure relates to a lens system and an electronic device, more particularly to a lens system applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, a lens system includes four lens elements. The four lens elements are, in order from an object side to an image side, a first lens element, a second lens element, a third lens element and a fourth lens element. Each of the four lens elements has an object-side surface facing toward the object side and an image-side surface facing toward the image side.

At least one of the object-side surface and the image-side surface of the first lens element has at least one inflection point. The fourth lens element has positive refractive power, the object-side surface of the fourth lens element is convex in a paraxial region thereof, and at least one of the object-side surface and the image-side surface of the fourth lens element has at least one inflection point.

When an axial distance between the object-side surface of the first lens element and an image surface is TL, a focal length of the lens system is f, an Abbe number of the fourth lens element is Vd4, a curvature radius of the object-side surface of the fourth lens element is R7, and a curvature radius of the image-side surface of the fourth lens element is R8, the following conditions are satisfied:
$4.85 < TL/f < 15.0$;
$10.0 < Vd4 < 38.0$; and
$-3.50 < (R7+R8)/(R7-R8) < 0.85$.

According to another aspect of the present disclosure, a lens system includes four lens elements. The four lens elements are, in order from an object side to an image side, a first lens element, a second lens element, a third lens element and a fourth lens element. Each of the four lens elements has an object-side surface facing toward the object side and an image-side surface facing toward the image side.

The object-side surface of the first lens element is concave in a paraxial region thereof, and at least one of the object-side surface and the image-side surface of the first lens element has at least one inflection point. The fourth lens element has positive refractive power.

When an axial distance between the object-side surface of the first lens element and an image surface is TL, a focal length of the lens system is f, a central thickness of the second lens element is CT2, a central thickness of the third lens element is CT3, a curvature radius of the object-side surface of the fourth lens element is R7, a curvature radius of the image-side surface of the fourth lens element is R8, and an entrance pupil diameter of the lens system is EPD, the following conditions are satisfied:
$4.85 < TL/f < 15.0$;
$0.10 < CT2/CT3 < 0.95$;
$(R7+R8)/(R7-R8) < 0.35$; and
$1.25 < f/EPD < 2.50$.

According to another aspect of the present disclosure, an electronic device includes an identification module and a plate. The identification module includes one of the aforementioned lens systems and an image sensor. The image sensor is disposed on the image surface of the lens system. The plate is disposed on an object side of the identification module, and the plate is a module having a display function. In addition, an axial distance between the plate and the first lens element is smaller than 1.50 mm.

BRIEF DESCRIPTION OF THE DRAWINGS

The disclosure can be better understood by reading the following detailed description of the embodiments, with reference made to the accompanying drawings as follows.

DETAILED DESCRIPTION

An electronic device includes an identification module and a plate. The identification module includes a lens system and an image sensor. The lens system includes four lens elements, and the four lens elements are, in order from an object side to an image side, a first lens element, a second lens element, a third lens element and a fourth lens element. Each of the four lens elements of the lens system has an object-side surface facing toward the object side and an image-side surface facing toward the image side. Moreover, the image sensor is disposed on an image surface of the lens system, and the plate is disposed on an object side of the identification module.

The first lens element can have negative refractive power. Therefore, it is favorable for enlarging the viewing angle of the lens system so as to increase the image identification area. The object-side surface of the first lens element can be concave in a paraxial region thereof. Therefore, it is favorable for the lens system to have a retrofocus configuration so as to increase the detection range thereof. The object-side surface of the first lens element can have at least one convex critical point in an off-axis region thereof. Therefore, it is favorable for controlling the incident angles of peripheral light on the lens surfaces so as to prevent total reflection, and it is also favorable for controlling the size of the first lens element so as to minimize the overall size of the lens system. At least one of the object-side surface and the image-side surface of the first lens element has at least one inflection point. Therefore, it is favorable for controlling the size of the first lens element while receiving light with a large incident angle so as to prevent the object-side size of the lens system from being overly large. Please refer to FIG. 30, which shows a schematic view a convex critical point C and an inflection point P of the object-side surface 111 of the first lens element 110 according to the 1st embodiment of the present disclosure.

The image-side surface of the third lens element can be concave in a paraxial region thereof. Therefore, it is favorable for reducing the back focal length so as to control the total track length of the lens system. The image-side surface of the third lens element can have at least one convex critical point in an off-axis region thereof. Therefore, it is favorable for balancing the shape of the image-side surface of the third lens element so as to correct off-axis aberrations, thereby meeting the requirement of compactness.

Figure 30:
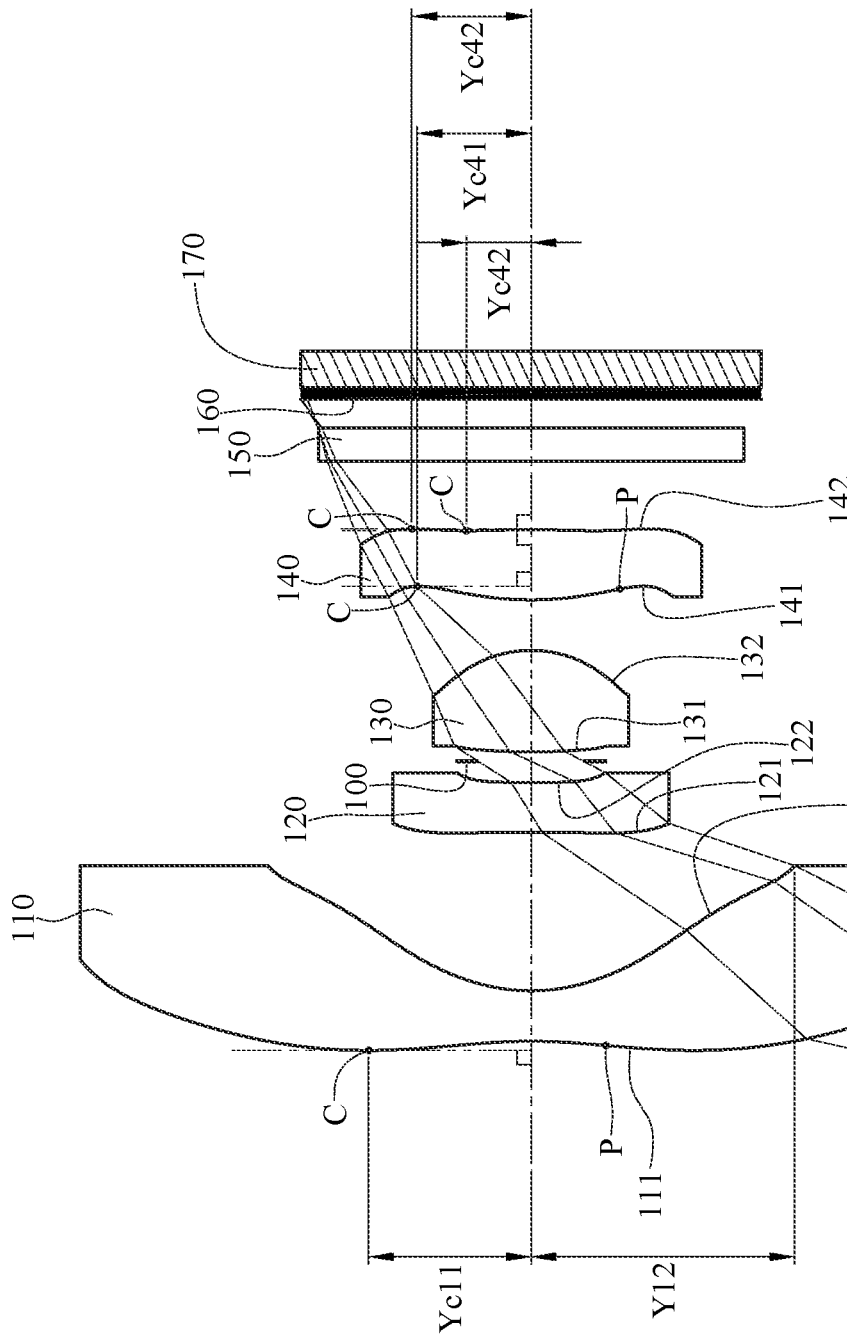
FIG. 30 shows a schematic view of Y12, Yc11, Yc41, Yc42 and inflection points and critical points of the first and fourth lens elements according to the 1st embodiment of the present disclosure.

The fourth lens element has positive refractive power. Therefore, it is favorable for providing significant light converging capability so as to control the size of the lens system, and it's also favorable for the lens system to have a retrofocus configuration. The object-side surface of the fourth lens element can be convex in a paraxial region thereof. Therefore, it is favorable for arranging the surface curvatures of the fourth lens element so as to enhance light converging capability. The object-side surface of the fourth lens element can have at least one concave critical point in an off-axis region thereof. Therefore, it is favorable for reducing the incident angle of peripheral light on the fourth lens element so as to correct field curvature. The image-side surface of the fourth lens element can be convex in a paraxial region thereof. Therefore, it is favorable for controlling the incident angle of light on the image sensor so as to prevent vignetting in the peripheral region of images. The image-side surface of the fourth lens element can have a convex-to-concave-to-convex shape change in order from the paraxial region thereof to an off-axis region thereof. Therefore, it is favorable for correcting off-axis aberrations and reducing the size of the lens system. At least one of the object-side surface and the image-side surface of the fourth lens element can have at least one inflection point. Therefore, it is favorable for reducing the back focal length of the lens system for controlling the total track length. Please refer to FIG. 30, which shows a schematic view of critical points C and an inflection point P of the fourth lens element 140 according to the 1st embodiment of the present disclosure. The critical points and some of the inflection points on the object-side surface of the first lens element, the object-side surface and image-side surface of the fourth lens element in FIG. 30 are only exemplary. Other lens surfaces of the four lens elements may also have one or more critical points and inflection points.

When an axial distance between the object-side surface of the first lens element and the image surface is TL, and a focal length of the lens system is f, the following condition is satisfied: $4.85<\text{TL}/f<15.0$. Therefore, it is favorable for balancing the total track length and the field of view for meeting the specifications. Moreover, the following condition can also be satisfied: $5.50<\text{TL}/f<12.0$.

When an Abbe number of the fourth lens element is Vd4, the following condition can be satisfied: $10.0<\text{Vd4}<38.0$. Therefore, it is favorable for increasing the refractive capability of the fourth lens element so as to effectively reduce the total track length of the lens system. Moreover, the following condition can also be satisfied: $13.0<\text{Vd4}<30.0$. According to the present disclosure, the Abbe number Vd of one lens element is obtained from the following equation: $\text{Vd}=(N-1)/(NF-NC)$, wherein Nd is the refractive index of said lens element at the wavelength of helium d-line (587.6 nm), NF is the refractive index of said lens element at the wavelength of hydrogen F-line (486.1 nm), and NC is the refractive index of said lens element at the wavelength of hydrogen C-line (656.3 nm).

When a curvature radius of the object-side surface of the fourth lens element is R7, and a curvature radius of the image-side surface of the fourth lens element is R8, the following condition is satisfied: $-3.50<(R7+R8)/(R7-R8)<0.85$. Therefore, it is favorable for controlling light path on the object side of the fourth lens element so as to improve image quality by correcting aberrations on the image side thereof. Moreover, the following condition can also be satisfied: $-1.80<(R7+R8)/(R7-R8)<0.50$. Moreover, the following condition can also be satisfied: $(R7+R8)/(R7-R8)<0.35$. Moreover, the following condition can also be satisfied: $-50.0<(R7+R8)/(R7-R8)<0.25$.

When a central thickness of the second lens element is CT2, and a central thickness of the third lens element is CT3, the following condition can be satisfied: $0.10<\text{CT2}/\text{CT3}<0.95$. Therefore, it is favorable for properly allocating the space in the lens system so as to increase manufacturing yield rate and image quality as well as to enhance the controlling capability of the third lens element. Moreover, the following condition can also be satisfied: $0.20<\text{CT2}/\text{CT3}<0.65$. Moreover, the following condition can also be satisfied: $0.40<\text{CT2}/\text{CT3}<0.63$.

When the focal length of the lens system is f, and an entrance pupil diameter of the lens system is EPD, the following condition can be satisfied: $1.25<f/\text{EPD}<2.50$. Therefore, it is favorable for adjusting the entrance pupil so as to provide sufficient incident light, thereby increasing image brightness. Moreover, the following condition can also be satisfied: $1.0<f/\text{EPD}<2.05$. Moreover, the following condition can also be satisfied: $1.0<f/\text{EPD}<2.0$. Moreover, the following condition can also be satisfied: $1.20<f/\text{EPD}<1.80$.

When the focal length of the lens system is f, and a focal length of the second lens element is f2, the following condition can be satisfied: $-0.15<f/f2<0.15$. Therefore, the second lens element configured as a correction lens is favorable for correcting spherical aberration and coma generated by the first lens element and improving image quality at the off-axis region. Moreover, the following condition can also be satisfied: $-0.10<f/f2<0.10$.

When a minimum value among Abbe numbers of all lens elements of the lens system is Vdmin, the following condition can be satisfied: $13.0<\text{Vdmin}<21.0$. Therefore, it is favorable for better controlling the light path so as to increase the design flexibility for satisfying high-end product specifications.

When a maximum effective radius of the image-side surface of the first lens element is Y12, and a curvature radius of the image-side surface of the first lens element is R2, the following condition can be satisfied: $1.02<\text{Y12}/R2<4.50$. Therefore, it is favorable for controlling the size of the first lens element so as to meet the requirements of a large field of view and compactness. Moreover, the following condition can also be satisfied: $1.02<\text{Y12}/R2<2.50$. Please refer to FIG. 30, which shows a schematic view of Y12 according to the 1st embodiment of the present disclosure.

When a vertical distance between a non-axial critical point on the object-side surface of the first lens element and an optical axis is Yc11, and the focal length of the lens system is f, the object-side surface of the first lens element can have at least one critical point in the off-axis region thereof satisfying the following condition: $0.50<\text{Yc11}/f<5.0$. Therefore, it is favorable for correcting off-axis aberrations and reducing the total track length of the lens system so as to meet the requirements of compactness and a large field of view. Moreover, the following condition can also be satisfied: $0.80<\text{Yc11}/f<3.0$. Please refer to FIG. 30, which shows a schematic view of Yc11 according to the 1st embodiment of the present disclosure.

When a maximum image height of the lens system (half of a diagonal length of an effective photosensitive area of the image sensor) is ImgH, and the focal length of the lens system is f, the following condition can be satisfied: $2.0<\text{ImgH}/f<8.0$. Therefore, it is favorable for providing a better viewing angle of the lens system for various applications. Moreover, the following condition can also be satisfied: $2.3<\text{ImgH}/f<4.0$.

When half of a maximum field of view of the lens system is HFOV, and an f-number of the lens system is Fno, the following condition can be satisfied: $1.50<\tan(\text{HFOV})/\text{Fno}$. Therefore, it is favorable for retrieving more light while satisfying the requirement of a large field of view. Moreover, the following condition can also be satisfied: $1.70<\tan(\text{HFOV})/\text{Fno}<5.50$.

According to the present disclosure, the lens system further includes an aperture stop, and the aperture stop can be disposed between the second lens element and the third lens element. Therefore, it is favorable for positioning the aperture stop so as to balance the field of view and total track length for meeting the requirements of a large field of view and compactness.

When an axial distance between the aperture stop and the image-side surface of the fourth lens element is SD, and an axial distance between the object-side surface of the first lens element and the image-side surface of the fourth lens element is TD, the following condition can be satisfied: $0.40<\text{SD}/\text{TD}<0.95$. Therefore, it is favorable for balancing the position of the aperture stop in the lens system so as to control the field of view and the total track length.

When the axial distance between the object-side surface of the first lens element and the image surface is TL, and the maximum image height of the lens system is ImgH, the following condition can be satisfied: $2.0<\text{TL}/\text{ImgH}<3.50$. Therefore, it is favorable for providing a sufficient light-receiving area while obtaining compactness so as to maintain sufficient image brightness. Moreover, the following condition can also be satisfied: $2.0<\text{TL}/\text{ImgH}<3.0$. Moreover, the following condition can also be satisfied: $2.30<\text{TL}/\text{ImgH}<3.0$.

When a curvature radius of the object-side surface of the first lens element is R1, and the focal length of the lens system is f, the following condition can be satisfied: $-12.0<R1/f<0$. Therefore, it is favorable for the first lens element to have a proper light divergence capability so as to obtain a wide field of view. Moreover, the following condition can also be satisfied: −8.0<R1/f<−2.0.

Figure 31:
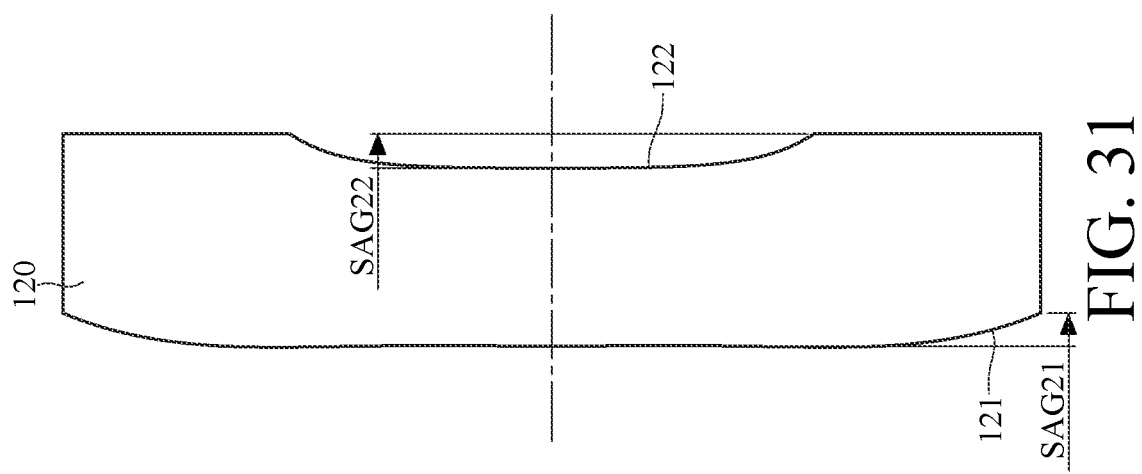
FIG. 31 shows a schematic view of SAG21, SAG22 and the second lens element according to the 1st embodiment of the present disclosure.

When a displacement in parallel with the optical axis from an axial vertex to a maximum effective radius position on the object-side surface of the second lens element is SAG21, a displacement in parallel with the optical axis from an axial vertex to a maximum effective radius position on the image-side surface of the second lens element is SAG22, and the focal length of the lens system is f, the following condition can be satisfied: 0≤(|SAG21|+|SAG22|)/f<0.50. Therefore, it is favorable for avoiding excessive surface shape changes of the second lens element so as to maintain sufficient peripheral image quality. Moreover, the following condition can also be satisfied: 0≤(|SAG21|+|SAG22|)/f<0.35. Please refer to FIG. 31, which shows a schematic view of SAG21, SAG22 and the second lens element 120 according to the 1st embodiment of the present disclosure. Furthermore, each of SAG21 and SAG22 is a directional displacement. When the displacement from the axial vertex to the maximum effective radius position on one surface is facing towards the image side of the lens system, the value of displacement is positive; when the displacement from the axial vertex to the maximum effective radius position on one surface is facing towards the object side of the lens system, the value of displacement is negative.

According to the present disclosure, at least one lens element with positive refractive power of the lens system can have an Abbe number smaller than 30.0. Therefore, it is favorable for increasing the refractive capability of the lens system so as to reduce the size thereof, thereby achieving compactness. Moreover, at least one lens element with positive refractive power of the lens system can have an Abbe number smaller than 28.0.

When an Abbe number of the first lens element is Vd1, an Abbe number of the second lens element is Vd2, an Abbe number of the third lens element is Vd3, the Abbe number of the fourth lens element is Vd4, an Abbe number of the i-th lens element is Vdi, a refractive index of the first lens element is N1, a refractive index of the second lens element is N2, a refractive index of the third lens element is N3, a refractive index of the fourth lens element is N4, and a refractive index of the i-th lens element is Ni, at least one lens element of the lens system can satisfy the following condition: Vdi/Ni<13.5, wherein i=1, 2, 3 or 4. Therefore, it is favorable for increasing the refractive capability of lens elements so as to improve design specifications and image quality. Moreover, at least one lens element of the lens system can also satisfy the following condition: Vdi/Ni<12.0, wherein i=1, 2, 3 or 4.

When the axial distance between the object-side surface of the first lens element and the image surface is TL, the following condition can be satisfied: 1.0 [mm]<TL<3.0 [mm]. Therefore, it is favorable for controlling the total track length so as to meet the requirement of compactness.

According to the present disclosure, the central thickness of the third lens element can be a maximum among central thicknesses of all lens elements of the lens system. Therefore, it is favorable for balancing the refractive power distribution of the lens system.

When a vertical distance between a non-axial critical point on the image-side surface of the fourth lens element and the optical axis is Yc42, and the focal length of the lens system is f, the image-side surface of the fourth lens element can have at least one critical point in the off-axis region thereof satisfying the following condition: 0.20<Yc42/f<2.0. Therefore, it is favorable for correcting field curvature, reducing the total track length and flattening the Petzval surface of the lens system. Please refer to FIG. 30, which shows a schematic view of Yc42 according to the 1st embodiment of the present disclosure.

When a vertical distance between a non-axial critical point on the object-side surface of the fourth lens element and the optical axis is Yc41, and the focal length of the lens system is f, the object-side surface of the fourth lens element can have at least one critical point in the off-axis region thereof satisfying the following condition: 0.30<Yc41/f<2.0. Therefore, it is favorable for reducing the back focal length so as to reduce the overall size of the lens system. Please refer to FIG. 30, which shows a schematic view of Yc41 according to the 1st embodiment of the present disclosure.

According to the present disclosure, an axial distance between the plate and the first lens element of the lens system can be smaller than 1.50 mm. Therefore, it is favorable for controlling the thickness of the electronic device so as to meet the requirements of becoming lighter and thinner.

According to the present disclosure, the lens system can be operated with infrared light, visible light or monochromatic light, but the present disclosure is not limited thereto.

According to the present disclosure, the aforementioned features and conditions can be utilized in numerous combinations so as to achieve corresponding effects.

According to the present disclosure, the lens elements of the lens system can be made of either glass or plastic material. When the lens elements are made of glass material, the refractive power distribution of the lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the lens system can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, when the parameters (e.g., refractive index and focal length) of the lens system, the identification module and the electronic device are not specifically defined, these parameters may be determined according to the operating wavelength range.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the lens system, based on the corresponding image sensor, can be flat or curved, especially a curved surface being concave facing towards the object side of the lens system.

According to the present disclosure, an image correction unit, such as a field flattener, can be optionally disposed between the lens element closest to the image side of the lens system and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the identification module or the image capturing unit. In general, a preferable image correction unit is, for example, a thin transparent element having a concave object-side surface and a planar image-side surface, and the thin transparent element is disposed near the image surface.

According to the present disclosure, the lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the lens system and thereby provides a wider field of view for the same.

According to the present disclosure, the lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
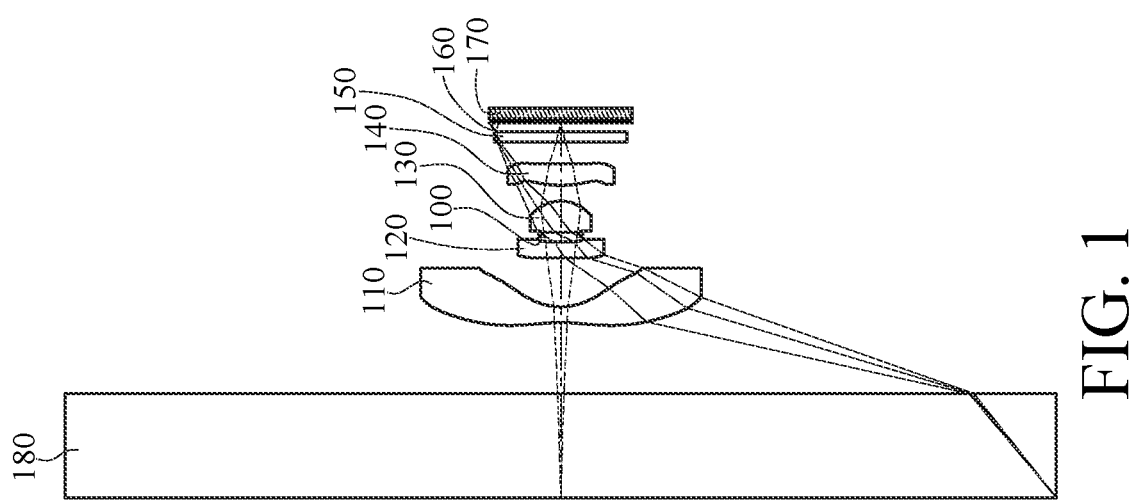
FIG. 1 is a schematic view of an identification module and a plate according to the 1st embodiment of the present disclosure.
Figure 2:
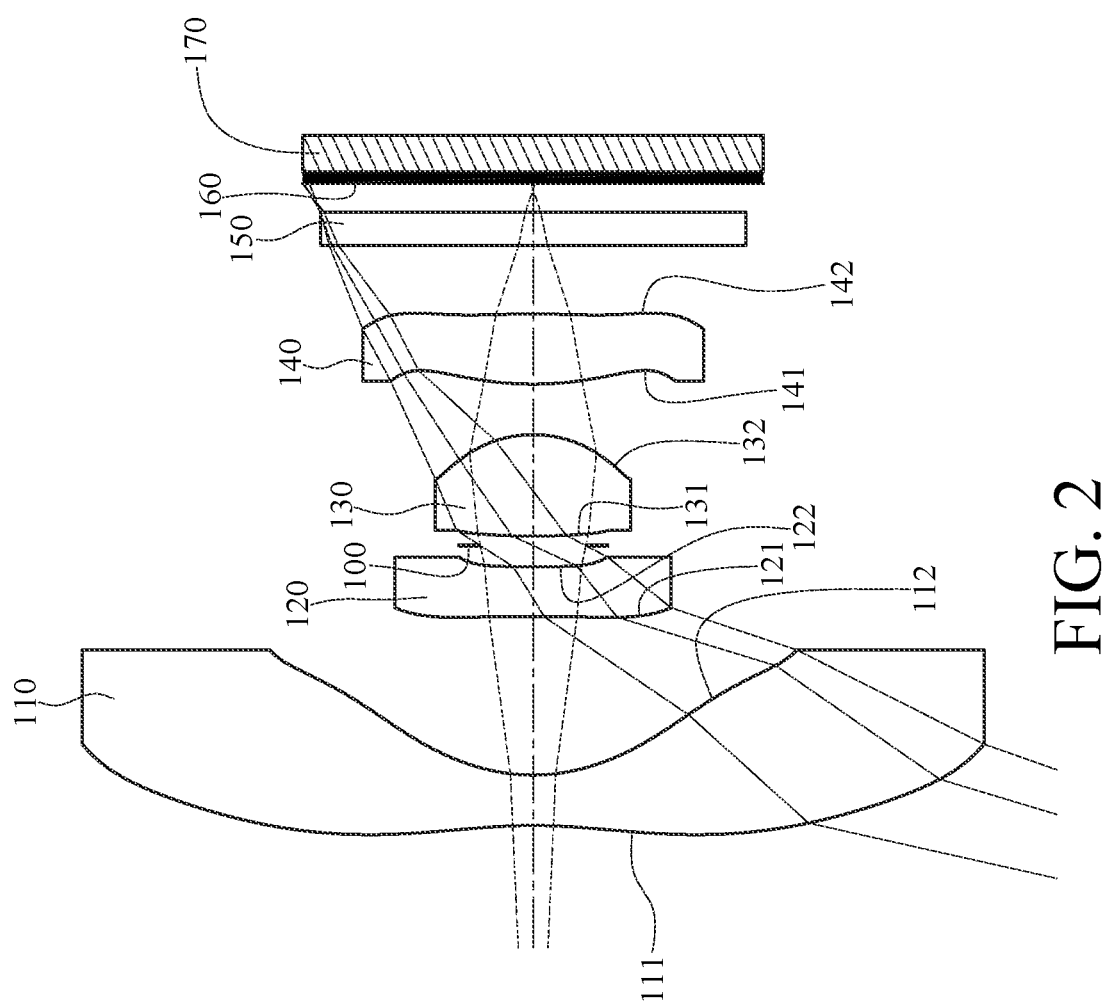
FIG. 2 is a schematic view of the identification module in FIG. 1.
Figure 3:
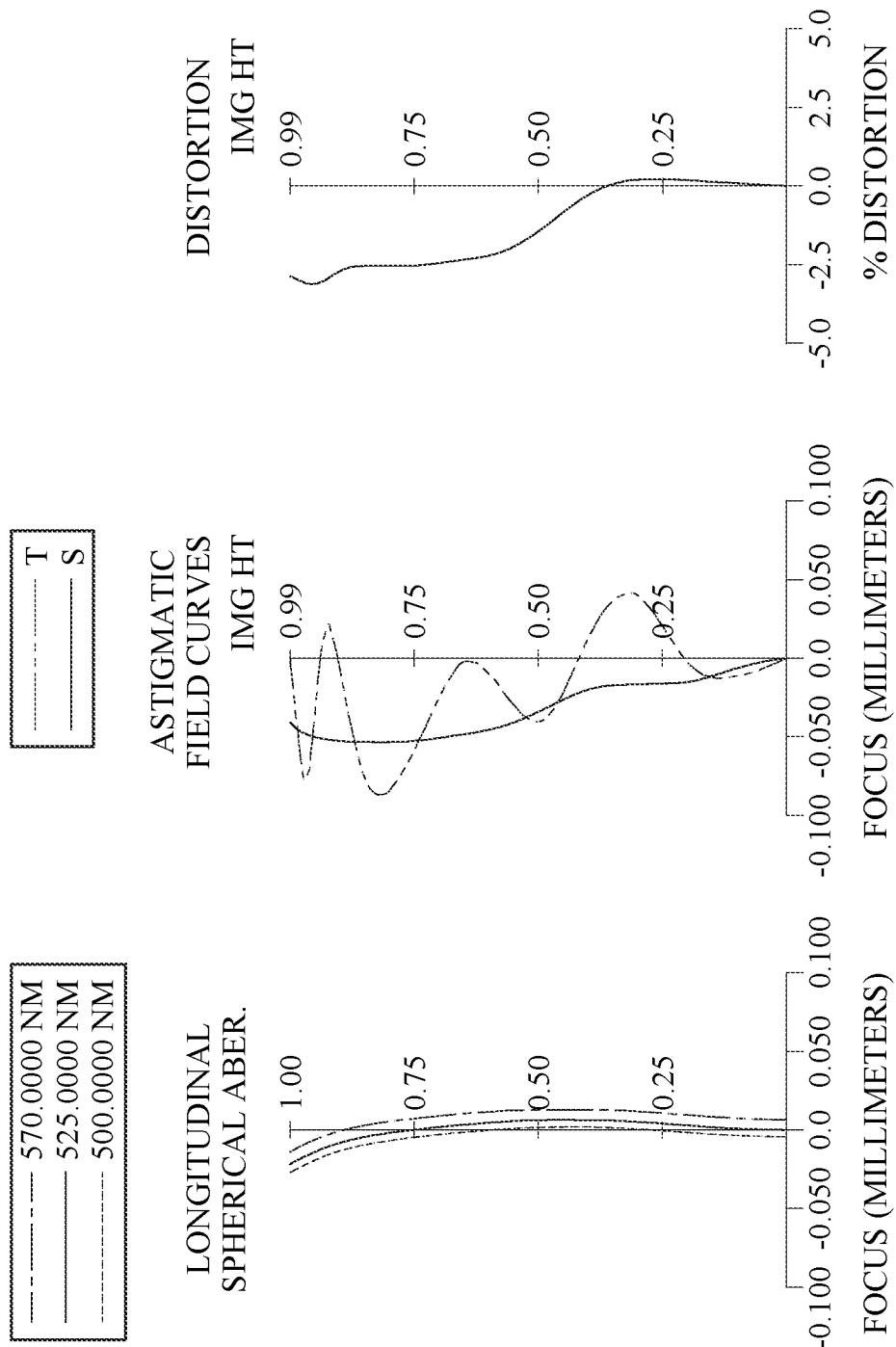
FIG. 3 shows spherical aberration curves, astigmatic field curves and a distortion curve of the identification module according to the 1st embodiment.

FIG. 1 is a schematic view of an identification module and a plate according to the 1st embodiment of the present disclosure. FIG. 2 is a schematic view of the identification module in FIG. 1. FIG. 3 shows, in order from left to right, spherical aberration curves, astigmatic field curves and a distortion curve of the identification module according to the 1st embodiment. In FIG. 1 and FIG. 2, the identification module includes the lens system (its reference numeral is omitted) of the present disclosure and an image sensor 170. The lens system includes, in order from an object side to an image side, a first lens element 110, a second lens element 120, an aperture stop 100, a third lens element 130, a fourth lens element 140, a filter 150 and an image surface 160. The lens system includes four lens elements (110, 120, 130 and 140) with no additional lens element disposed between each of the adjacent four lens elements.

The first lens element 110 with negative refractive power has an object-side surface 111 being concave in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has at least one inflection point. The image-side surface 112 of the first lens element 110 has at least one inflection point. The object-side surface 111 of the first lens element 110 has at least one convex critical point in an off-axis region thereof.

The second lens element 120 with positive refractive power has an object-side surface 121 being convex in a paraxial region thereof and an image-side surface 122 being concave in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric. The object-side surface 141 of the fourth lens element 140 has at least one inflection point. The image-side surface 142 of the fourth lens element 140 has at least one inflection point. The object-side surface 141 of the fourth lens element 140 has at least one concave critical point in an off-axis region thereof. The image-side surface 142 of the fourth lens element 140 has at least one critical point in an off-axis region thereof. In addition, the image-side surface 142 of the fourth lens element 140 has a convex-to-concave-to-convex shape change in order from the paraxial region thereof to the off-axis region thereof.

The filter 150 is made of glass material and located between the fourth lens element 140 and the image surface 160, and will not affect the focal length of the lens system.

The image sensor 170 is disposed on or near the image surface 160 of the lens system.

The plate 180 is made of glass material and located on an object side of the identification module, and will not affect the focal length of the lens system. An axial distance between the plate 180 and the first lens element 110 is 1.000 mm.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16 and 18.

In the lens system of the identification module according to the 1st embodiment, when a focal length of the lens system is f, an f-number of the lens system is Fno, and half of a maximum field of view of the lens system is HFOV, these parameters have the following values: f=0.37 millimeters (mm), Fno=1.63, HFOV=73.3 degrees (deg.).

When an Abbe number of the fourth lens element 140 is Vd4, the following condition is satisfied: Vd4=19.4.

When a minimum value among Abbe numbers of all lens elements of the lens system is Vdmin, the following condition is satisfied: Vdmin=19.4. In this embodiment, among the four lens elements (110, 120, 130 and 140) of the lens system, the Abbe number of the fourth lens element 140 is smaller than Abbe numbers of the other lens elements, and Vdmin is equal to the Abbe number of the fourth lens element 140.

When an Abbe number of the first lens element 110 is Vd1, and a refractive index of the first lens element 110 is N1, the following condition is satisfied: Vd1/N1=36.18. When an Abbe number of the second lens element 120 is Vd2, and a refractive index of the second lens element 120 is N2, the following condition is satisfied: Vd2/N2=23.79.

When an Abbe number of the third lens element 130 is Vd3, and a refractive index of the third lens element 130 is N3, the following condition is satisfied: Vd3/N3=36.18.

When the Abbe number of the fourth lens element 140 is Vd4, and a refractive index of the fourth lens element 140 is N4, the following condition is satisfied: Vd4/N4=11.53.

When a central thickness of the second lens element 120 is CT2, and a central thickness of the third lens element 130 is CT3, the following condition is satisfied: CT2/CT3=0.50.

When a curvature radius of the object-side surface 111 of the first lens element 110 is R1, and the focal length of the lens system is f, the following condition is satisfied: R1/f=−6.00.

When a curvature radius of the object-side surface 141 of the fourth lens element 140 is R7, and a curvature radius of the image-side surface 142 of the fourth lens element 140 is R8, the following condition is satisfied: (R7+R8)/(R7−R8)=−0.45.

When the focal length of the lens system is f, and a focal length of the second lens element 120 is f2, the following condition is satisfied: f/f2=0.002.

When an axial distance between the object-side surface 111 of the first lens element 110 and the image surface 160 is TL, the following condition is satisfied: T=2.81 [mm].

When an axial distance between the aperture stop 100 and the image-side surface 142 of the fourth lens element 140 is SD, and an axial distance between the object-side surface 111 of the first lens element 110 and the image-side surface 142 of the fourth lens element 140 is TD, the following condition is satisfied: SD/TD=0.45.

When a maximum image height of the lens system is ImgH, and the focal length of the lens system is f, the following condition is satisfied: ImgH/f=2.71. When the axial distance between the object-side surface 111 of the first lens element 110 and the image surface 160 is TL, and the maximum image height of the lens system is ImgH, the following condition is satisfied: TL/ImgH=2.81.

When the axial distance between the object-side surface 111 of the first lens element 110 and the image surface 160 is TL, and the focal length of the lens system is f, the following condition is satisfied: TL/f=7.60.

When the focal length of the lens system is f, and an entrance pupil diameter of the lens system is EPD, the following condition is satisfied: f/EPD=1.63.

When a maximum effective radius of the image-side surface 112 of the first lens element 110 is Y12, and a curvature radius of the image-side surface 112 of the first lens element 110 is R2, the following condition is satisfied: Y12/R2=1.45.

When half of the maximum field of view of the lens system is HFOV, and the f-number of the lens system is Fno, the following condition is satisfied: tan(HFOV)/Fno=2.04.

When a displacement in parallel with the optical axis from an axial vertex to a maximum effective radius position on the object-side surface 121 of the second lens element 120 is SAG21, a displacement in parallel with the optical axis from an axial vertex to a maximum effective radius position on the image-side surface 122 of the second lens element 120 is SAG22, and the focal length of the lens system is f, the following condition is satisfied: (|SAG21|+|SAG22|)/f=0.23.

When a vertical distance between the critical point on the object-side surface 111 of the first lens element 110 and the optical axis is Yc11, and the focal length of the lens system is f, the following condition is satisfied: Yc11/f=1.93.

When a vertical distance between the critical point on the object-side surface 141 of the fourth lens element 140 and the optical axis is Yc41, and the focal length of the lens system is f, the following condition is satisfied: Yc41/f=1.33.

When a vertical distance between the critical point on the image-side surface 142 of the fourth lens element 140 and the optical axis is Yc42, and the focal length of the lens system is f, the following condition is satisfied: Yc42/f=0.75 and 1.40.

The detailed optical data of the 1st embodiment are shown in Table 1 and the aspheric surface data are shown in Table 2 below.

TABLE 1

1st Embodiment
f = 0.37 mm, Fno = 1.63, HFOV = 73.3 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Plate | Plano | | 1.465 | Glass | 1.517 | 64.2 | — |
| 2 | | Plano | | 1.000 | | | | |
| 3 | Lens 1 | −2.215 | (ASP) | 0.220 | Plastic | 1.548 | 56.0 | −1.04 |
| 4 | | 0.795 | (ASP) | 0.691 | | | | |
| 5 | Lens 2 | 8.074 | (ASP) | 0.220 | Plastic | 1.572 | 37.4 | 171.37 |
| 6 | | 8.711 | (ASP) | 0.093 | | | | |
| 7 | Ape. Stop | Plano | | 0.041 | | | | |
| 8 | Lens 3 | 2.359 | (ASP) | 0.444 | Plastic | 1.548 | 56.0 | 0.81 |
| 9 | | −0.513 | (ASP) | 0.221 | | | | |
| 10 | Lens 4 | 1.517 | (ASP) | 0.307 | Plastic | 1.682 | 19.4 | 1.65 |
| 11 | | −3.999 | (ASP) | 0.300 | | | | |
| 12 | Filter | Plano | | 0.145 | Glass | 1.517 | 64.2 | — |
| 13 | | Plano | | 0.125 | | | | |
| 14 | Image | Plano | | — | | | | |

Note: Reference wavelength is 525.0 nm.

TABLE 2

Aspheric Coefficients

| Surface # | 3 | 4 | 5 | 6 |
|---|---|---|---|---|
| k = | −4.5457E+01 | −1.0647E+00 | −5.0000E+01 | −9.0000E+01 |
| A4 = | 1.4243E−01 | −4.0076E−01 | −1.8165E+00 | 4.4097E−01 |
| A6 = | −8.3307E−02 | 2.2158E+00 | 1.5111E+01 | 3.9396E+01 |
| A8 = | 3.3028E−02 | −5.7827E+00 | −5.3375E+01 | −1.1634E+02 |
| A10 = | −8.1611E−03 | 6.6905E+00 | 1.1047E+02 | −2.9746E+03 |
| A12 = | 1.0366E−03 | −3.6908E+00 | −1.2252E+02 | 5.0345E+04 |
| A14 = | −3.9220E−05 | 8.0346E−01 | 5.5911E+01 | −2.0658E+05 |

| Surface # | 8 | 9 | 10 | 11 |
|---|---|---|---|---|
| k = | 8.6931E+00 | −6.1802E+00 | 1.6016E+00 | −8.7791E+01 |
| A4 = | −1.6223E+00 | −4.2958E+00 | 1.4004E+00 | 6.8232E−01 |
| A6 = | 4.2607E+01 | −4.6582E+00 | −4.4578E+01 | 8.6627E−01 |
| A8 = | −9.4874E+02 | 3.8271E+02 | 6.0375E+02 | −5.6698E+00 |
| A10 = | 1.3100E+04 | −5.0858E+03 | −4.6820E+03 | −5.3071E+01 |
| A12 = | −8.3196E+04 | 3.7405E+04 | 2.1154E+04 | 3.4494E+02 |
| A14 = | 2.0002E+05 | −1.5407E+05 | −5.5624E+04 | −8.5359E+02 |
| A16 = | — | 2.8561E+05 | 7.8566E+04 | 1.0023E+03 |
| A18 = | — | — | −4.5886E+04 | −4.6127E+02 |

In Table 1, the curvature radius, the thickness and the focal length are shown in millimeters (mm). Surface numbers 0-14 represent the surfaces sequentially arranged from the object side to the image side along the optical axis. In Table 2, k represents the conic coefficient of the equation of the aspheric surface profiles. A4-18 represent the aspheric coefficients ranging from the 4th order to the 18th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 4:
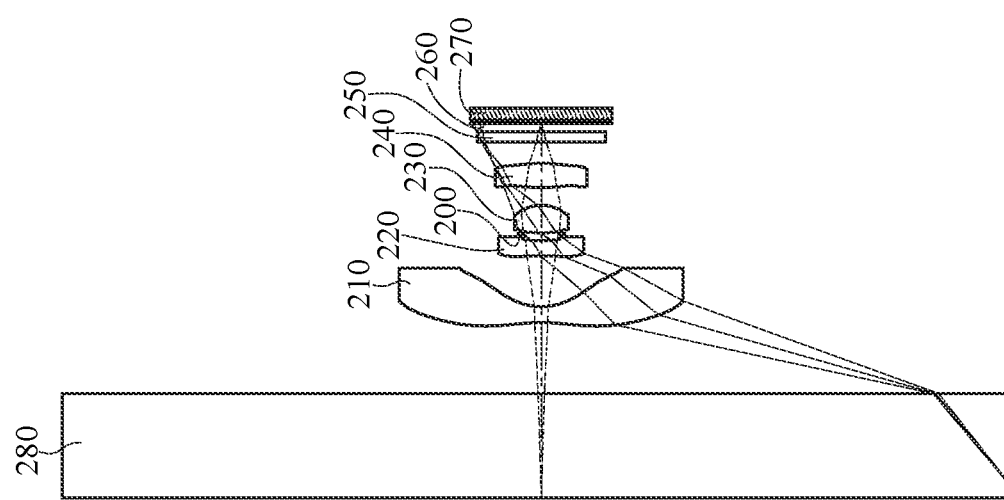
FIG. 4 is a schematic view of an identification module and a plate according to the 2nd embodiment of the present disclosure.
Figure 5:
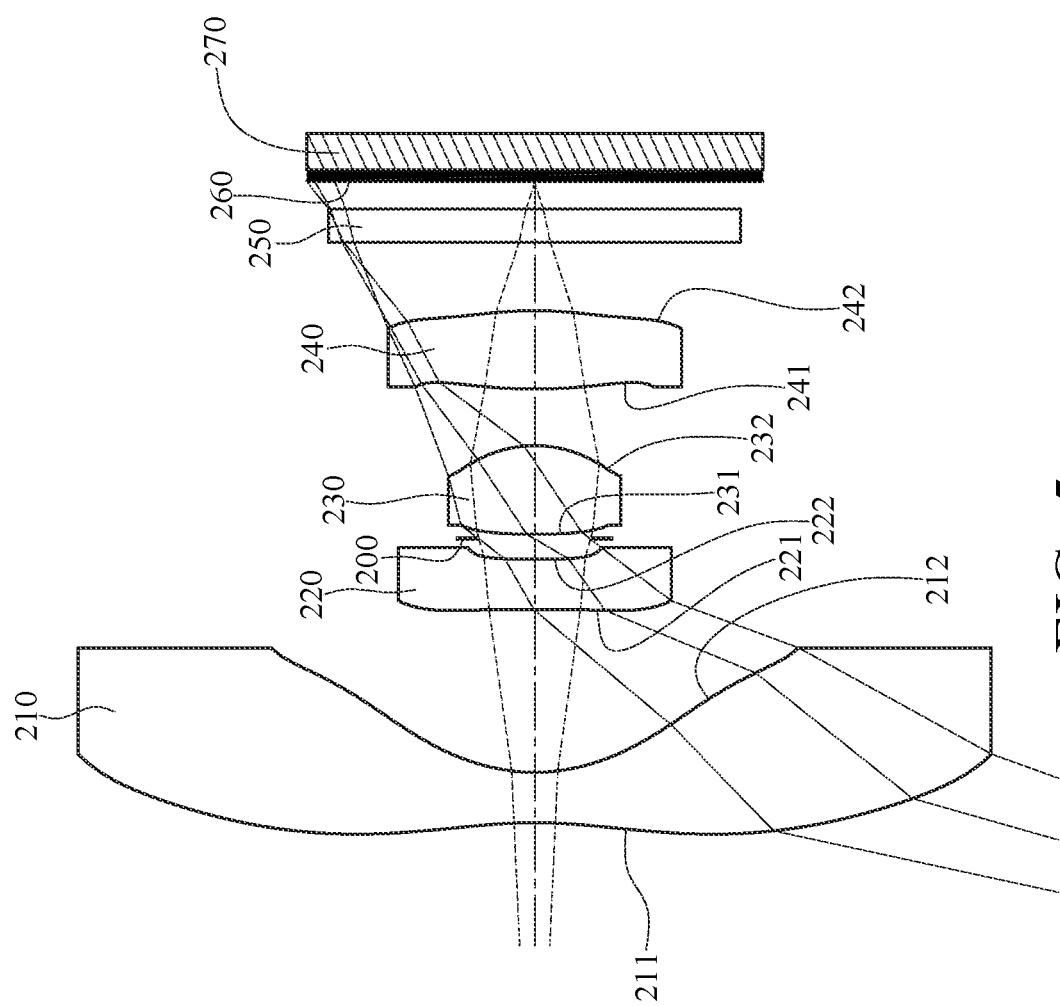
FIG. 5 is a schematic view of the identification module in FIG. 4.
Figure 6:
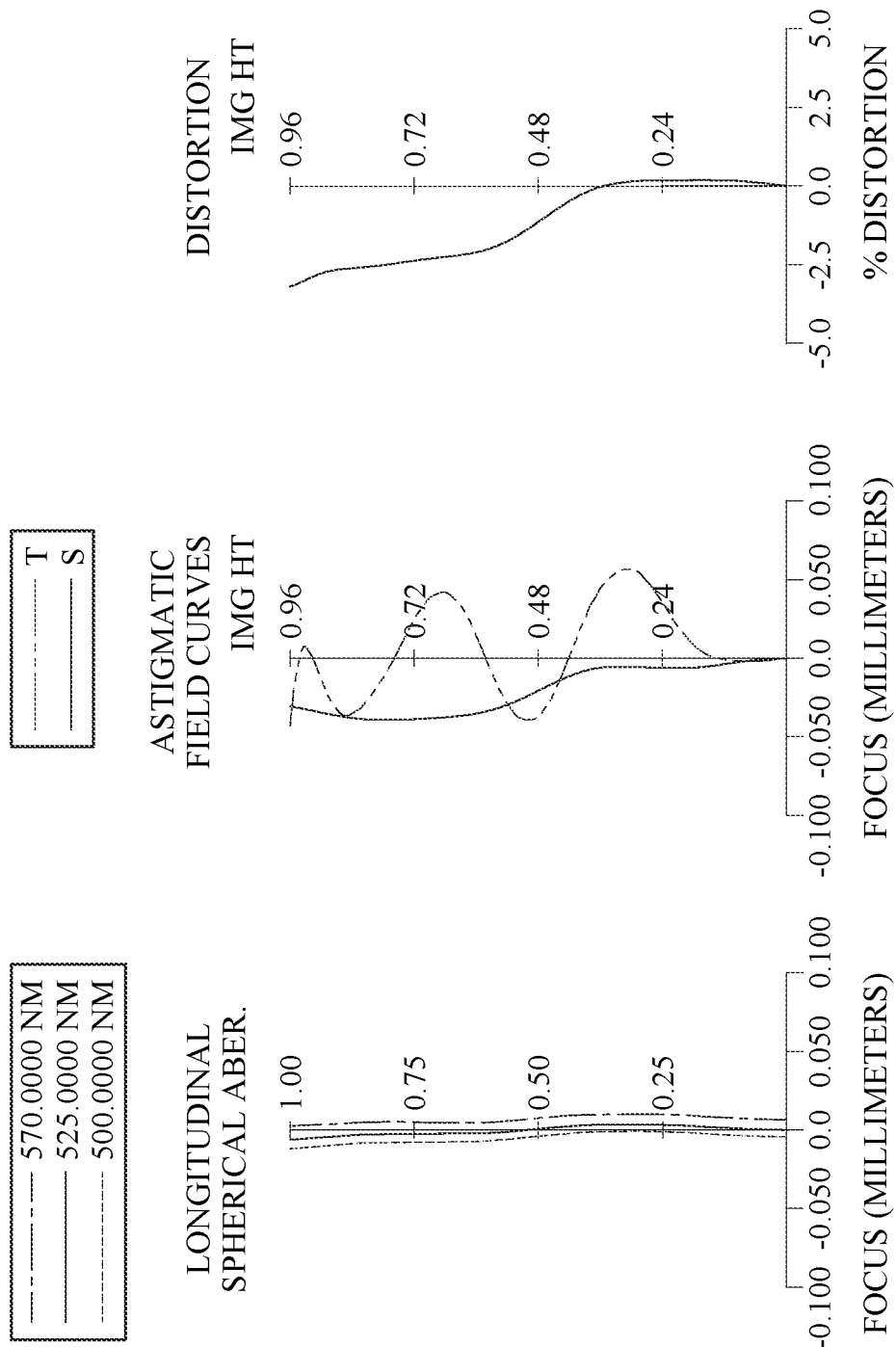
FIG. 6 shows spherical aberration curves, astigmatic field curves and a distortion curve of the identification module according to the 2nd embodiment.

FIG. 4 is a schematic view of an identification module and a plate according to the 2nd embodiment of the present disclosure. FIG. 5 is a schematic view of the identification module in FIG. 4. FIG. 6 shows, in order from left to right, spherical aberration curves, astigmatic field curves and a distortion curve of the identification module according to the 2nd embodiment. In FIG. 4 and FIG. 5, the identification module includes the lens system (its reference numeral is omitted) of the present disclosure and an image sensor 270. The lens system includes, in order from an object side to an image side, a first lens element 210, a second lens element 220, an aperture stop 200, a third lens element 230, a fourth lens element 240, a filter 250 and an image surface 260. The lens system includes four lens elements (210, 220, 230 and 240) with no additional lens element disposed between each of the adjacent four lens elements.

The first lens element 210 with negative refractive power has an object-side surface 211 being concave in a paraxial region thereof and an image-side surface 212 being concave in a paraxial region thereof. The first lens element 210 is made of plastic material and has the object-side surface 211 and the image-side surface 212 being both aspheric. The object-side surface 211 of the first lens element 210 has at least one inflection point. The image-side surface 212 of the first lens element 210 has at least one inflection point. The object-side surface 211 of the first lens element 210 has at least one convex critical point in an off-axis region thereof.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric. The object-side surface 241 of the fourth lens element 240 has at least one inflection point. The image-side surface 242 of the fourth lens element 240 has at least one inflection point. The object-side surface 241 of the fourth lens element 240 has at least one concave critical point in an off-axis region thereof. In addition, the image-side surface 242 of the fourth lens element 240 has a convex-to-concaveto-convex shape change in order from the paraxial region thereof to an off-axis region thereof.

The filter 250 is made of glass material and located between the fourth lens element 240 and the image surface 260, and will not affect the focal length of the lens system. The image sensor 270 is disposed on or near the image surface 260 of the lens system.

The plate 280 is made of glass material and located on an object side of the identification module, and will not affect the focal length of the lens system. An axial distance between the plate 280 and the first lens element 210 is 1.000 mm.

The detailed optical data of the 2nd embodiment are shown in Table 3 and the aspheric surface data are shown in Table 4 below.

Moreover, these parameters can be calculated from Table 3 and Table 4 as the following values and satisfy the following conditions:

| 2nd Embodiment | | | |
|---|---|---|---|
| f [mm] | 0.37 | f/f2 | −0.01 |
| Fno | 1.60 | TL [mm] | 2.80 |
| HFOV [deg.] | 74.1 | SD/TD | 0.45 |
| Vd4 | 19.4 | ImgH/f | 2.60 |
| Vdmin | 19.4 | TL/ImgH | 2.92 |
| Vd1/N1 | 36.18 | TL/f | 7.61 |
| Vd2/N2 | 36.11 | f/EPD | 1.60 |
| Vd3/N3 | 36.18 | Y12/R2 | 1.46 |
| Vd4/N4 | 11.53 | tan(HFOV)/Fno | 2.19 |

TABLE 3

2nd Embodiment
f = 0.37 mm, Fno = 1.60, HFOV = 74.1 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Plate | Plano | | 1.465 | Glass | 1.517 | 64.2 | — |
| 2 | | Plano | | 1.000 | | | | |
| 3 | Lens 1 | −2.051 | (ASP) | 0.220 | Plastic | 1.548 | 56.0 | −1.01 |
| 4 | | 0.790 | (ASP) | 0.711 | | | | |
| 5 | Lens 2 | 6.535 | (ASP) | 0.221 | Plastic | 1.548 | 55.9 | −31.62 |
| 6 | | 4.688 | (ASP) | 0.088 | | | | |
| 7 | Ape. Stop | Plano | | 0.020 | | | | |
| 8 | Lens 3 | 2.203 | (ASP) | 0.388 | Plastic | 1.548 | 56.0 | 0.80 |
| 9 | | −0.512 | (ASP) | 0.248 | | | | |
| 10 | Lens 4 | 2.444 | (ASP) | 0.343 | Plastic | 1.682 | 19.4 | 1.45 |
| 11 | | −1.576 | (ASP) | 0.300 | | | | |
| 12 | Filter | Plano | | 0.145 | Glass | 1.517 | 64.2 | — |
| 13 | | Plano | | 0.119 | | | | |
| 14 | Image | Plano | | — | | | | |

Note: Reference wavelength is 525.0 nm.

TABLE 4

Aspheric Coefficients

| Surface # | 3 | 4 | 5 | 6 |
|---|---|---|---|---|
| k = | −3.4078E+01 | −1.0651E+00 | −5.0000E+01 | −9.0000E+01 |
| A4 = | 1.3944E−01 | −3.4253E−01 | −2.3722E+00 | −2.5390E+00 |
| A6 = | −8.3120E−02 | 1.9039E+00 | 1.9022E+01 | 2.9509E+02 |
| A8 = | 3.3272E−02 | −5.0818E+00 | −6.6898E+01 | −1.0012E+04 |
| A10 = | −8.1494E−03 | 5.8984E+00 | 1.3993E+02 | 2.0923E+05 |
| A12 = | 1.0302E−03 | −3.2468E+00 | −1.6027E+02 | −2.2203E+06 |
| A14 = | −4.3149E−05 | 7.0417E−01 | 8.0510E+01 | 9.6743E+06 |

| Surface # | 8 | 9 | 10 | 11 |
|---|---|---|---|---|
| k = | 2.0000E+01 | −9.2931E+00 | 2.4663E+00 | −8.7791E+01 |
| A4 = | −7.9083E−01 | −5.1565E+00 | 1.5778E+00 | −1.6408E+00 |
| A6 = | 5.5186E+01 | −5.6144E+01 | −6.2815E+01 | 2.4261E+01 |
| A8 = | −1.5179E+03 | 2.8914E+03 | 1.0899E+03 | −1.5908E+02 |
| A10 = | 2.6684E+04 | −5.1054E+04 | −1.0562E+04 | 6.1629E+02 |
| A12 = | −2.1501E+05 | 4.7200E+05 | 5.9448E+04 | −1.5075E+03 |
| A14 = | 6.4436E+05 | −2.2451E+06 | −1.9502E+05 | 2.1990E+03 |
| A16 = | — | 4.4246E+06 | 3.4559E+05 | −1.6914E+03 |
| A18 = | — | — | −2.5641E+05 | 4.9403E+02 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

-continued

| 2nd Embodiment | | | |
|---|---|---|---|
| CT2/CT3 | 0.57 | (|SAG21| + |SAG22|)/f | 0.25 |
| R1/f | −5.56 | Yc11/f | 2.11 |
| (R7 + R8)/(R7 − R8) | 0.22 | Yc41/f | 1.17 |

3rd Embodiment

Figure 7:
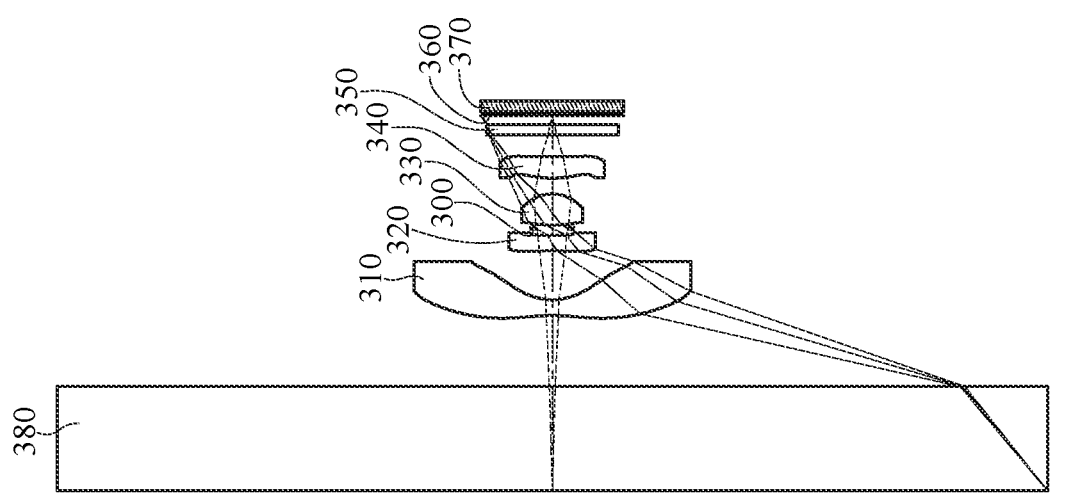
FIG. 7 is a schematic view of an identification module and a plate according to the 3rd embodiment of the present disclosure.
Figure 8:
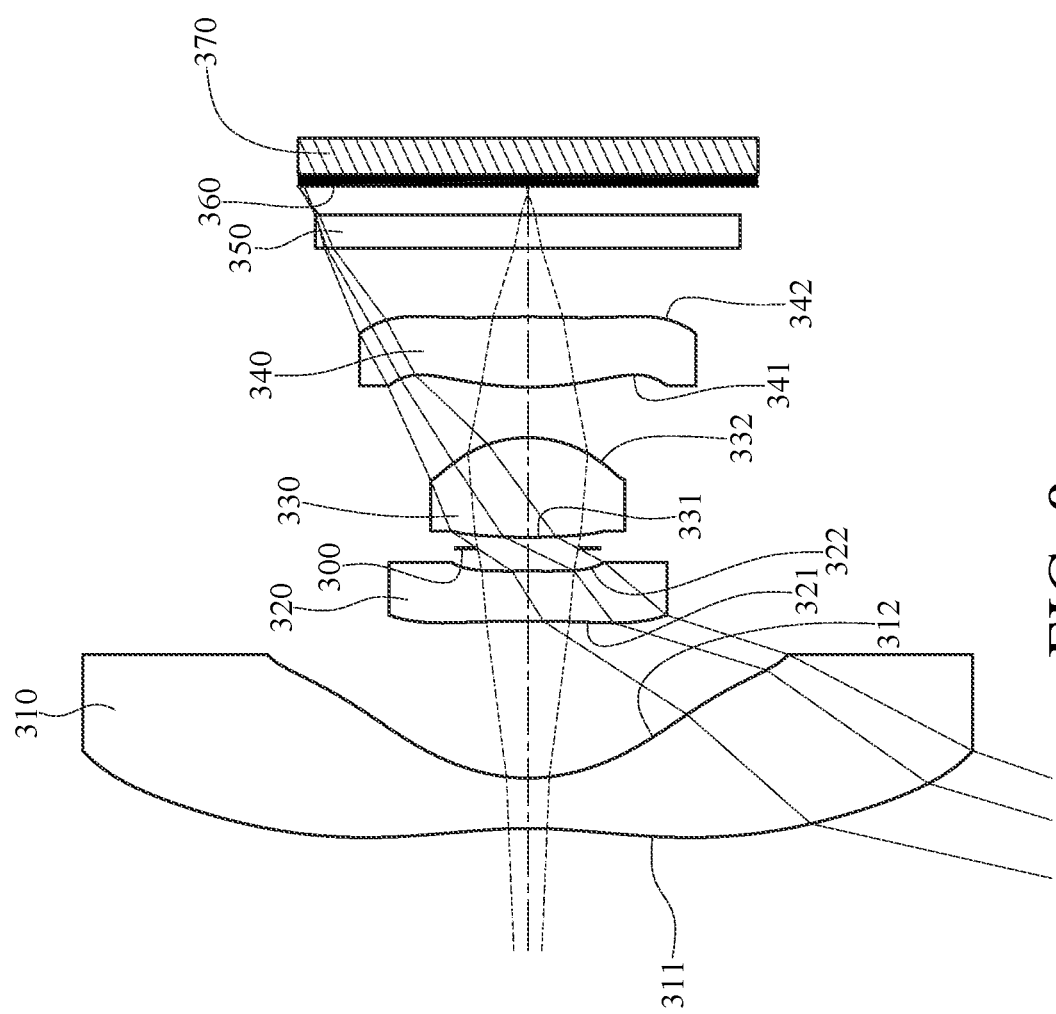
FIG. 8 is a schematic view of the identification module in FIG. 7.
Figure 9:
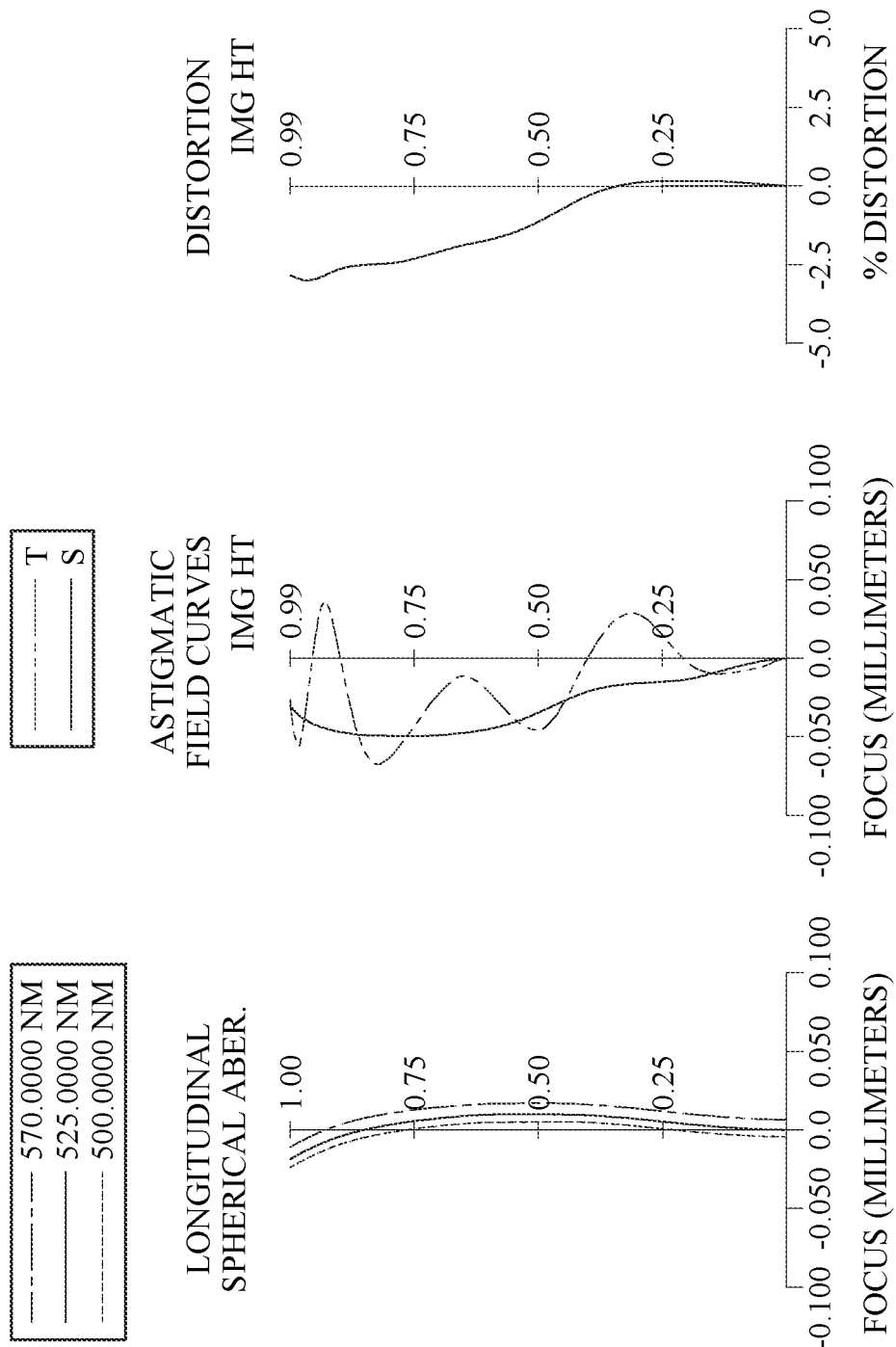
FIG. 9 shows spherical aberration curves, astigmatic field curves and a distortion curve of the identification module according to the 3rd embodiment.

FIG. 7 is a schematic view of an identification module and a plate according to the 3rd embodiment of the present disclosure. FIG. 8 is a schematic view of the identification module in FIG. 7. FIG. 9 shows, in order from left to right, spherical aberration curves, astigmatic field curves and a distortion curve of the identification module according to the 3rd embodiment. In FIG. 7 and FIG. 8, the identification module includes the lens system (its reference numeral is omitted) of the present disclosure and an image sensor 370. The lens system includes, in order from an object side to an image side, a first lens element 310, a second lens element 320, an aperture stop 300, a third lens element 330, a fourth lens element 340, a filter 350 and an image surface 360. The lens system includes four lens elements (310, 320, 330 and 340) with no additional lens element disposed between each of the adjacent four lens elements.

The first lens element 310 with negative refractive power has an object-side surface 311 being concave in a paraxial region thereof and an image-side surface 312 being concave in a paraxial region thereof. The first lens element 310 is made of plastic material and has the object-side surface 311 and the image-side surface 312 being both aspheric. The object-side surface 311 of the first lens element 310 has at least one inflection point. The image-side surface 312 of the first lens element 310 has at least one inflection point. The object-side surface 311 of the first lens element 310 has at least one convex critical point in an off-axis region thereof.

The second lens element 320 with positive refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has at least one inflection point. The image-side surface 342 of the fourth lens element 340 has at least one inflection point. The object-side surface 341 of the fourth lens element 340 has at least one concave critical point in an off-axis region thereof. The image-side surface 342 of the fourth lens element 340 has at least one critical point in an off-axis region thereof. In addition, the image-side surface 342 of the fourth lens element 340 has a convex-to-concave-to-convex shape change in order from the paraxial region thereof to the off-axis region thereof.

The filter 350 is made of glass material and located between the fourth lens element 340 and the image surface 360, and will not affect the focal length of the lens system. The image sensor 370 is disposed on or near the image surface 360 of the lens system.

The plate 380 is made of glass material and located on an object side of the identification module, and will not affect the focal length of the lens system. An axial distance between the plate 380 and the first lens element 310 is 1.000 mm.

The detailed optical data of the 3rd embodiment are shown in Table 5 and the aspheric surface data are shown in Table 6 below.

TABLE 5

3rd Embodiment
f = 0.37 mm, Fno = 1.72, HFOV = 73.4 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Plate | Plano | | 1.465 | Glass | 1.517 | 64.2 | — |
| 2 | | Plano | | 1.000 | | | | |
| 3 | Lens 1 | −2.204 | (ASP) | 0.220 | Plastic | 1.548 | 56.0 | −1.03 |
| 4 | | 0.786 | (ASP) | 0.686 | | | | |
| 5 | Lens 2 | −125.000 | (ASP) | 0.220 | Plastic | 1.572 | 37.4 | 59.21 |
| 6 | | −26.659 | (ASP) | 0.098 | | | | |
| 7 | Ape. Stop | Plano | | 0.049 | | | | |
| 8 | Lens 3 | 2.278 | (ASP) | 0.436 | Plastic | 1.548 | 56.0 | 0.82 |
| 9 | | −0.524 | (ASP) | 0.221 | | | | |
| 10 | Lens 4 | 1.423 | (ASP) | 0.307 | Plastic | 1.682 | 19.4 | 1.69 |
| 11 | | −5.569 | (ASP) | 0.300 | | | | |
| 12 | Filter | Plano | | 0.145 | Glass | 1.517 | 64.2 | — |
| 13 | | Plano | | 0.126 | | | | |
| 14 | Image | Plano | | — | | | | |

Note: Reference wavelength is 525.0 nm.

TABLE 6

Aspheric Coefficients

| Surface # | 3 | 4 | 5 | 6 |
|---|---|---|---|---|
| k = | −4.7006E+01 | −1.0653E+00 | 2.0000E+01 | −9.0000E+01 |
| A4 = | 1.4297E−01 | −3.5248E−01 | −1.6504E+00 | 6.2143E−01 |
| A6 = | −8.3248E−02 | 1.9555E+00 | 1.5807E+01 | 4.8222E+01 |
| A8 = | 3.2919E−02 | −5.2831E+00 | −6.2990E+01 | −4.8688E+02 |
| A10 = | −8.1371E−03 | 6.2161E+00 | 1.4712E+02 | 2.4893E+03 |
| A12 = | 1.0411E−03 | −3.4651E+00 | −1.8722E+02 | 7.0599E+03 |
| A14 = | −4.0065E−05 | 7.6096E−01 | 9.9840E+01 | −7.2868E+04 |

| Surface # | 8 | 9 | 10 | 11 |
|---|---|---|---|---|
| k = | 2.3660E+00 | −9.0567E+00 | 9.6319E−01 | −8.7791E+01 |
| A4 = | −1.6024E+00 | −6.4937E+00 | 9.7404E−01 | 6.1170E−01 |
| A6= | 4.0340E+01 | 3.5061E+01 | −3.8910E+01 | 6.4322E−01 |
| A8 = | −7.8820E+02 | −1.0003E+02 | 5.4071E+02 | −2.4932E+00 |
| A10 = | 1.0663E+04 | −9.6486E+02 | −4.2919E+03 | −8.2097E+01 |
| A12 = | −6.8155E+04 | 1.4152E+04 | 1.9790E+04 | 4.6259E+02 |
| A14 = | 1.6617E+05 | −7.5774E+04 | −5.3233E+04 | −1.0889E+03 |
| A16 = | — | 1.7056E+05 | 7.7253E+04 | 1.2396E+03 |
| A18 = | — | — | −4.6542E+04 | −5.5972E+02 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 0.37 | TL [mm] | 2.81 |
| Fno | 1.72 | SD/TD | 0.45 |

-continued

3rd Embodiment

| | | | |
|---|---|---|---|
| HFOV [deg.] | 73.4 | ImgH/f | 2.72 |
| Vd4 | 19.4 | TL/ImgH | 2.81 |
| Vdmin | 19.4 | TL/f | 7.63 |
| Vd1/N1 | 36.18 | f/EPD | 1.72 |
| Vd2/N2 | 23.79 | Y12/R2 | 1.45 |
| Vd3/N3 | 36.18 | tan(HFOV)/Fno | 1.95 |
| Vd4/N4 | 11.53 | (|SAG21| + |SAG22|)/f | 0.18 |
| CT2/CT3 | 0.50 | Yc11/f | 1.92 |
| R1/f | −5.99 | Yc41/f | 1.27 |
| (R7 + R8)/(R7 − R8) | −0.59 | Yc42/f | 0.70; 1.30 |
| f/f2 | 0.01 | — | — |

4th Embodiment

Figure 10:
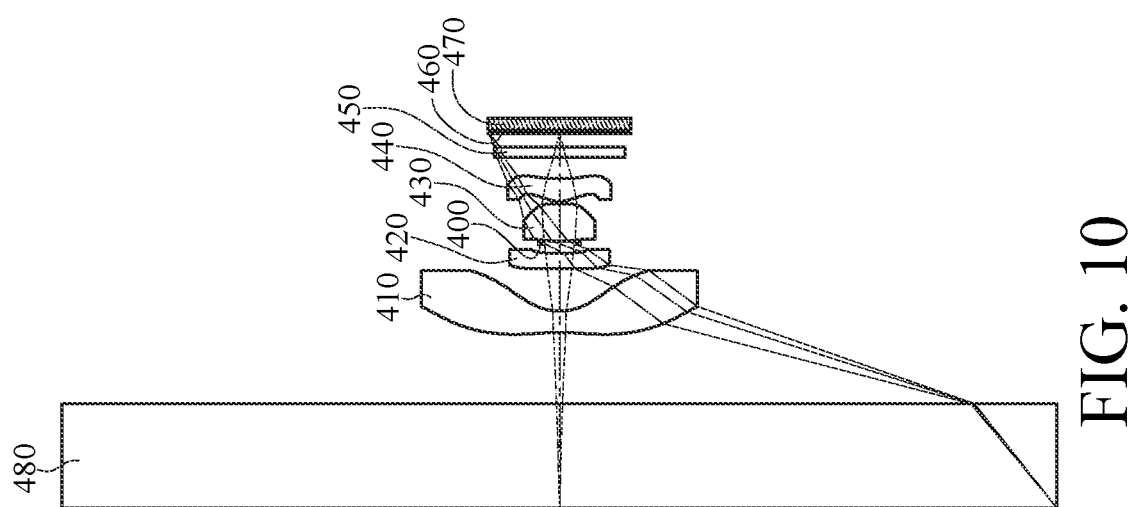
FIG. 10 is a schematic view of an identification module and a plate according to the 4th embodiment of the present disclosure.
Figure 11:
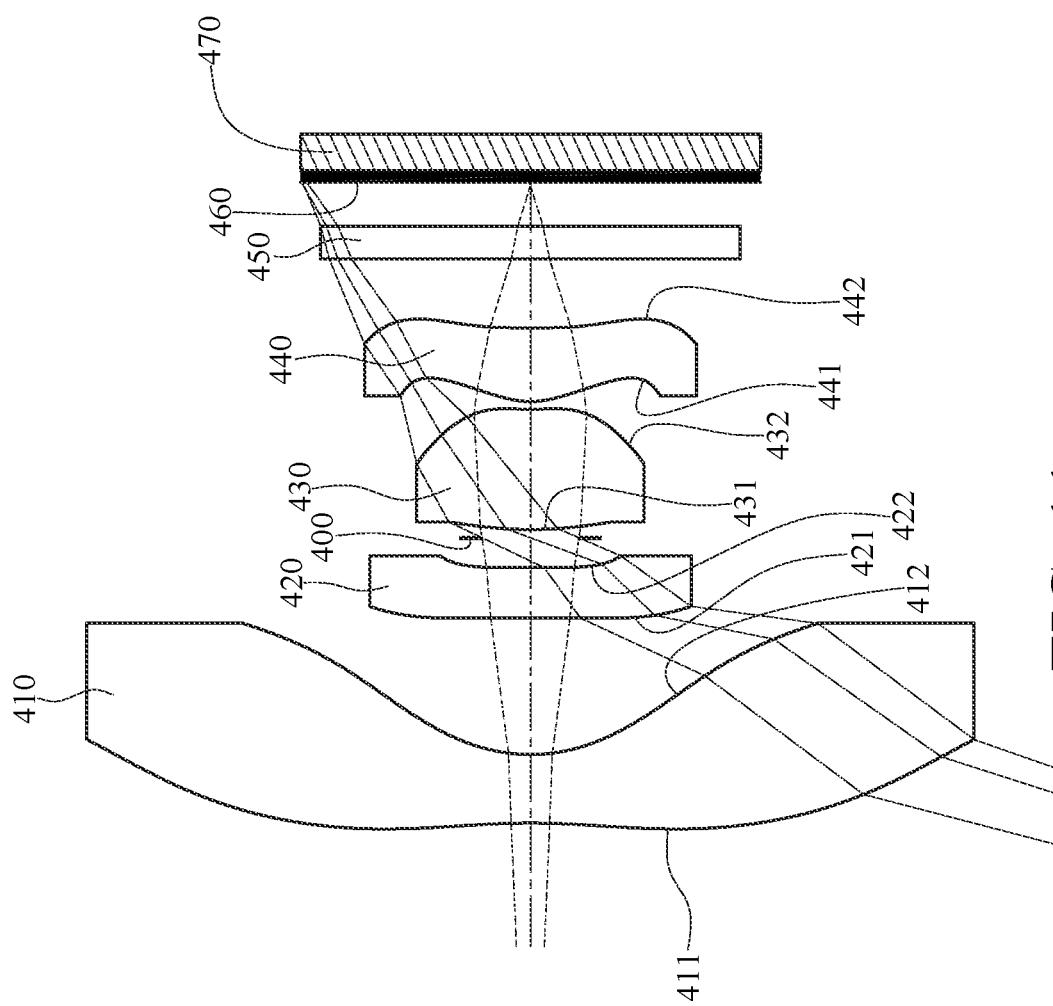
FIG. 11 is a schematic view of the identification module in FIG. 10.
Figure 12:
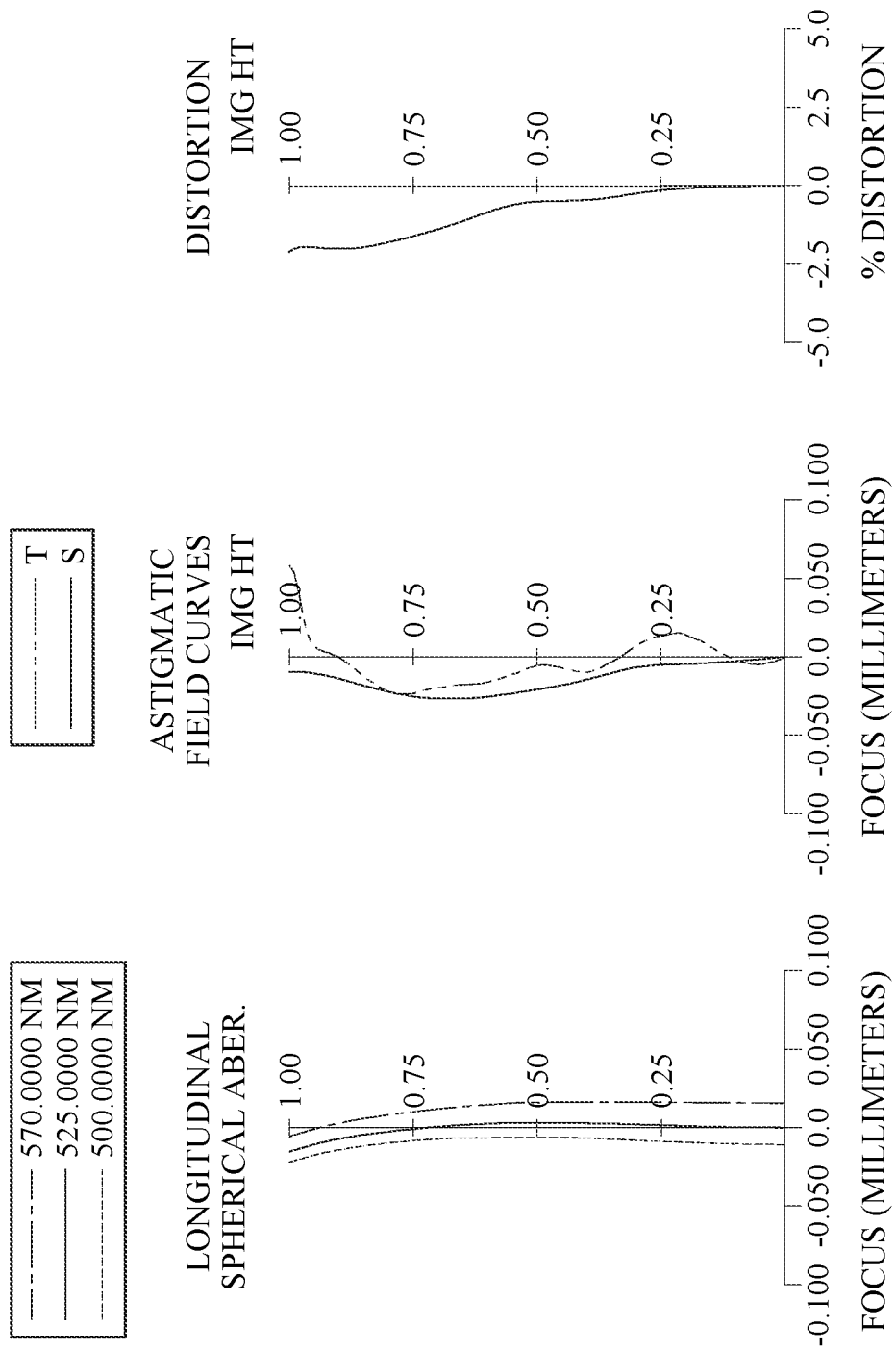
FIG. 12 shows spherical aberration curves, astigmatic field curves and a distortion curve of the identification module according to the 4th embodiment.

FIG. 10 is a schematic view of an identification module and a plate according to the 4th embodiment of the present disclosure. FIG. 11 is a schematic view of the identification module in FIG. 10. FIG. 12 shows, in order from left to right, spherical aberration curves, astigmatic field curves and a distortion curve of the identification module according to the 4th embodiment. In FIG. 10 and FIG. 11, the identification module includes the lens system (its reference numeral is omitted) of the present disclosure and an image sensor 470. The lens system includes, in order from an object side to an image side, a first lens element 410, a second lens element 420, an aperture stop 400, a third lens element 430, a fourth lens element 440, a filter 450 and an image surface 460. The lens system includes four lens elements (410, 420, 430 and 440) with no additional lens element disposed between each of the adjacent four lens elements.

The first lens element 410 with negative refractive power has an object-side surface 411 being concave in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has at least one inflection point. The image-side surface 412 of the first lens element 410 has at least one inflection point. The object-side surface 411 of the first lens element 410 has at least one convex critical point in an off-axis region thereof.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The image-side surface 432 of the third lens element 430 has at least one convex critical point in an off-axis region thereof.

The fourth lens element 440 with positive refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has at least one inflection point. The image-side surface 442 of the fourth lens element 440 has at least one inflection point. The object-side surface 441 of the fourth lens element 440 has at least one concave critical point in an off-axis region thereof. The image-side surface 442 of the fourth lens element 440 has at least one critical point in an off-axis region thereof.

The filter 450 is made of glass material and located between the fourth lens element 440 and the image surface 460, and will not affect the focal length of the lens system. The image sensor 470 is disposed on or near the image surface 460 of the lens system.

The plate 480 is made of glass material and located on an object side of the identification module, and will not affect the focal length of the lens system. An axial distance between the plate 480 and the first lens element 410 is 1.000 mm.

The detailed optical data of the 4th embodiment are shown in Table 7 and the aspheric surface data are shown in Table 8 below.

TABLE 7

4th Embodiment
f = 0.37 mm, Fno = 1.71, HFOV = 72.2 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Plate | Plano | | 1.465 | Glass | 1.517 | 64.2 | — |
| 2 | | Plano | | 1.000 | | | | |
| 3 | Lens 1 | −2.784 | (ASP) | 0.299 | Plastic | 1.548 | 56.0 | −1.04 |
| 4 | | 0.747 | (ASP) | 0.596 | | | | |
| 5 | Lens 2 | 7.594 | (ASP) | 0.221 | Plastic | 1.548 | 56.0 | 14.16 |
| 6 | | 353.912 | (ASP) | 0.131 | | | | |
| 7 | Ape. Stop | Plano | | 0.036 | | | | |
| 8 | Lens 3 | 1.554 | (ASP) | 0.526 | Plastic | 1.548 | 56.0 | −12.25 |
| 9 | | 1.111 | (ASP) | 0.034 | | | | |
| 10 | Lens 4 | 0.346 | (ASP) | 0.323 | Plastic | 1.682 | 19.4 | 0.51 |
| 11 | | 25.773 | (ASP) | 0.300 | | | | |
| 12 | Filter | Plano | | 0.145 | Glass | 1.517 | 64.2 | — |
| 13 | | Plano | | 0.191 | | | | |
| 14 | Image | Plano | | — | | | | |

Note: Reference wavelength is 525.0 nm.

TABLE 8

Aspheric Coefficients

| Surface # | 3 | 4 | 5 | 6 |
|---|---|---|---|---|
| k = | −8.3824E+01 | −1.0869E+00 | 1.7980E+01 | −9.0000E+01 |
| A4 = | 1.3519E−01 | 1.3847E−01 | −1.5809E+00 | −3.0159E−02 |
| A6 = | −7.9878E−02 | −6.0705E−01 | 1.3290E+01 | 3.9173E+01 |
| A8 = | 3.3334E−02 | 2.6941E−01 | −5.0492E+01 | −3.7311E+02 |
| A10 = | −8.1270E−03 | 1.4541E−01 | 1.0898E+02 | 1.7343E+03 |
| A12 = | 1.0255E−03 | −1.4691E−01 | −1.2581E+02 | −1.7990E+03 |
| A14 = | −5.3685E−05 | 3.2435E−02 | 6.0059E+01 | −4.7706E+03 |

| Surface # | 8 | 9 | 10 | 11 |
|---|---|---|---|---|
| k = | −6.5861E+01 | −4.1354E+01 | −1.9803E+00 | −9.0000E+01 |
| A4 = | 1.0885E+00 | −1.9547E+01 | −1.1745E+01 | 3.8825E+00 |
| A6 = | −8.3575E+00 | 2.2396E+02 | 1.6826E+02 | −3.3267E+01 |
| A8 = | 6.0670E+01 | −1.8875E+03 | −1.7139E+03 | 1.6695E+02 |
| A10 = | −7.6099E+02 | 1.0243E+04 | 1.1748E+04 | −6.0361E+02 |
| A12 = | 5.7142E+03 | −3.2917E+04 | −5.3406E+04 | 1.4596E+03 |
| A14 = | −1.4740E+04 | 5.5281E+04 | 1.5215E+05 | −2.2018E+03 |
| A16 = | — | −3.5639E+04 | −2.4473E+05 | 1.8572E+03 |
| A18 = | — | — | 1.6832E+05 | −6.6814E+02 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 0.37 | TL [mm] | 2.80 |
| Fno | 1.71 | SD/TD | 0.42 |
| HFOV [deg.] | 72.2 | ImgH/f | 2.71 |
| Vd4 | 19.4 | TL/ImgH | 2.80 |
| Vdmin | 19.4 | TL/f | 7.59 |
| Vd1/N1 | 36.18 | f/EPD | 1.71 |
| Vd2/N2 | 36.18 | Y12/R2 | 1.68 |
| Vd3/N3 | 36.18 | tan(HFOV)/Fno | 1.82 |
| Vd4/N4 | 11.53 | (|SAG21| + |SAG22|)/f | 0.28 |
| CT2/CT3 | 0.42 | Yc11/f | 1.72 |
| R1/f | −7.54 | Yc41/f | 1.19 |
| (R7 + R8)/(R7 − R8) | −1.03 | Yc42/f | 1.32 |
| f/f2 | 0.03 | — | — |

5th Embodiment

Figure 13:
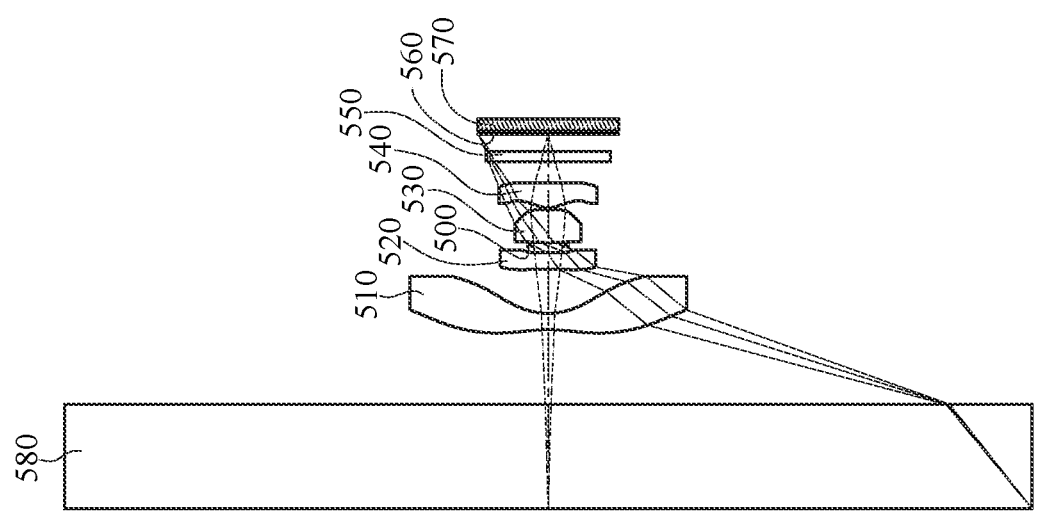
FIG. 13 is a schematic view of an identification module and a plate according to the 5th embodiment of the present disclosure.
Figure 14:
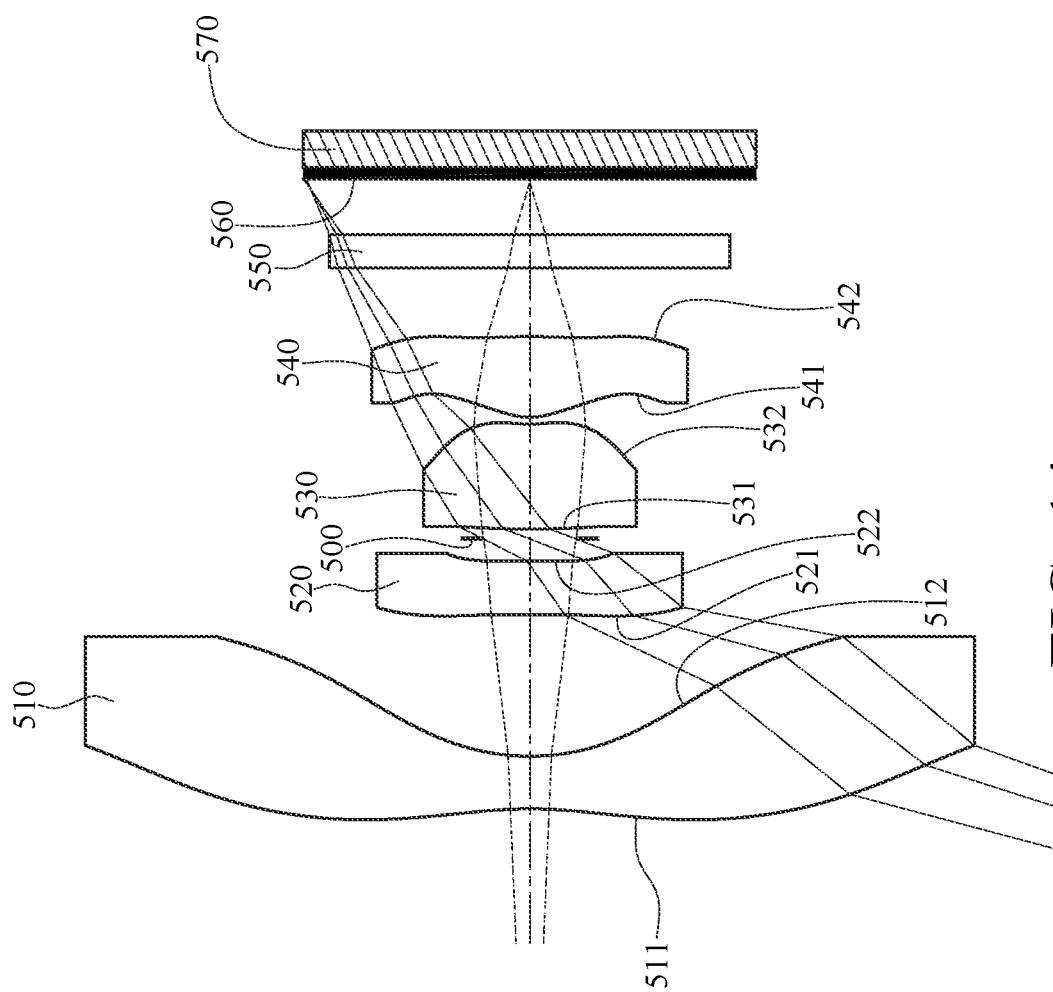
FIG. 14 is a schematic view of the identification module in FIG. 13.
Figure 15:
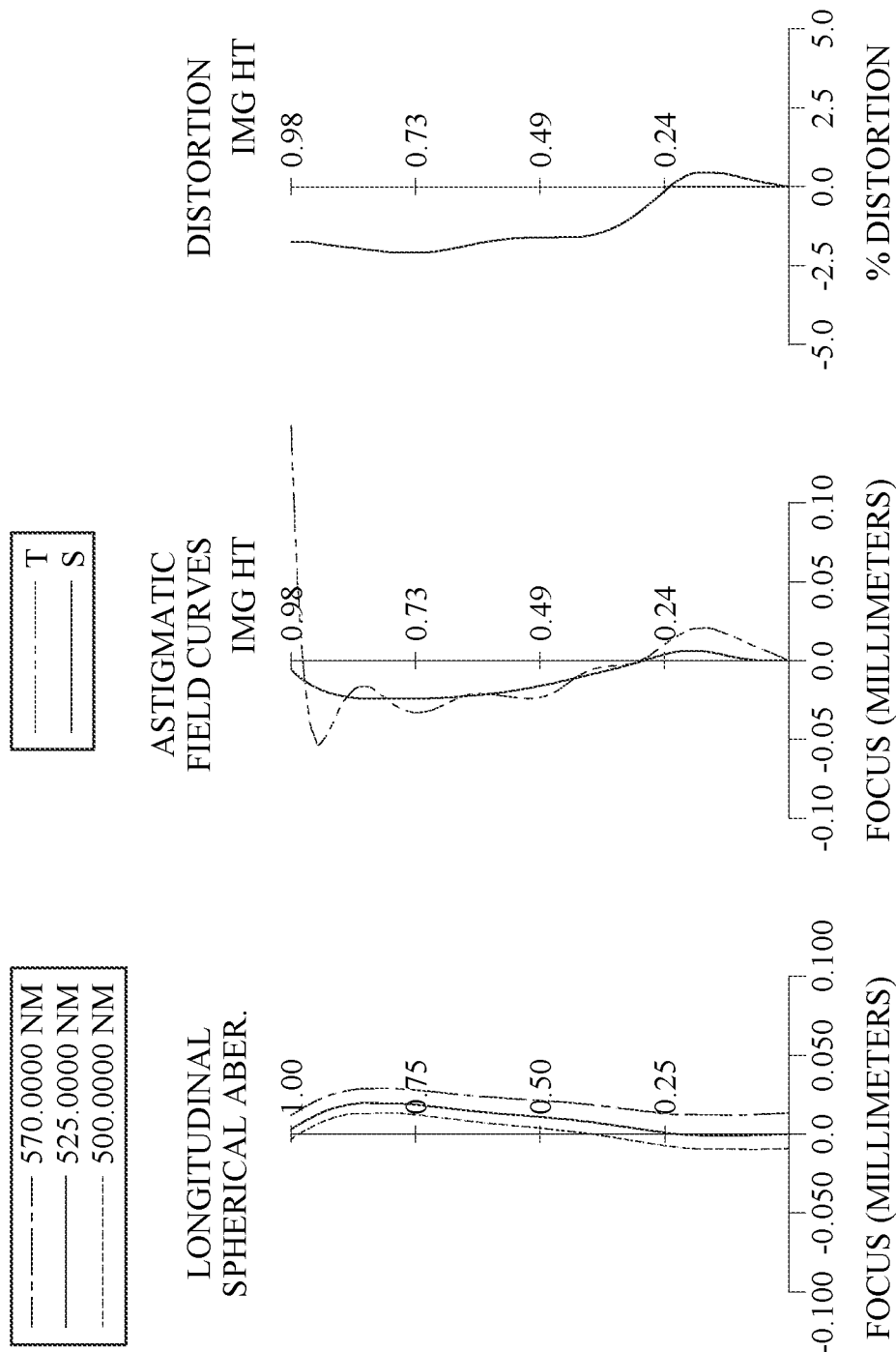
FIG. 15 shows spherical aberration curves, astigmatic field curves and a distortion curve of the identification module according to the 5th embodiment.

FIG. 13 is a schematic view of an identification module and a plate according to the 5th embodiment of the present disclosure. FIG. 14 is a schematic view of the identification module in FIG. 13. FIG. 15 shows, in order from left to right, spherical aberration curves, astigmatic field curves and a distortion curve of the identification module according to the 5th embodiment. In FIG. 13 and FIG. 14, the identification module includes the lens system (its reference numeral is omitted) of the present disclosure and an image sensor 570. The lens system includes, in order from an object side to an image side, a first lens element 510, a second lens element 520, an aperture stop 500, a third lens element 530, a fourth lens element 540, a filter 550 and an image surface 560. The lens system includes four lens elements (510, 520, 530 and 540) with no additional lens element disposed between each of the adjacent four lens elements.

The first lens element 510 with negative refractive power has an object-side surface 511 being concave in a paraxial region thereof and an image-side surface 512 being concave in a paraxial region thereof. The first lens element 510 is made of plastic material and has the object-side surface 511 and the image-side surface 512 being both aspheric. The object-side surface 511 of the first lens element 510 has at least one inflection point. The image-side surface 512 of the first lens element 510 has at least one inflection point. The object-side surface 511 of the first lens element 510 has at least one convex critical point in an off-axis region thereof.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The image-side surface 532 of the third lens element 530 has at least one convex critical point in an off-axis region thereof.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has at least one inflection point. The image-side surface 542 of the fourth lens element 540 has at least one inflection point. The object-side surface 541 of the fourth lens element 540 has at least one concave critical point in an off-axis region thereof. The image-side surface 542 of the fourth lens element 540 has at least one critical point in an off-axis region thereof. In addition, the image-side surface 542 of the fourth lens element 540 has a convex-to-concave-to-convex shape change in order from the paraxial region thereof to the off-axis region thereof.

The filter 550 is made of glass material and located between the fourth lens element 540 and the image surface 560, and will not affect the focal length of the lens system. The image sensor 570 is disposed on or near the image surface 560 of the lens system.

The plate 580 is made of glass material and located on an object side of the identification module, and will not affect the focal length of the lens system. An axial distance between the plate 580 and the first lens element 510 is 1.050 mm.

The detailed optical data of the 5th embodiment are shown in Table 9 and the aspheric surface data are shown in Table 10 below.

TABLE 9

5th Embodiment
f = 0.37 mm, Fno = 1.73, HFOV = 72.3 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Plate | Plano | | 1.465 | Glass | 1.517 | 64.2 | — |
| 2 | | Plano | | 1.050 | | | | |
| 3 | Lens 1 | −1.789 | (ASP) | 0.230 | Plastic | 1.548 | 56.0 | −1.15 |
| 4 | | 1.013 | (ASP) | 0.619 | | | | |
| 5 | Lens 2 | 488.903 | (ASP) | 0.234 | Plastic | 1.548 | 56.0 | 22.81 |
| 6 | | −12.818 | (ASP) | 0.097 | | | | |
| 7 | Ape. Stop | Plano | | 0.043 | | | | |
| 8 | Lens 3 | 2.745 | (ASP) | 0.459 | Plastic | 1.548 | 56.0 | −1.17 |
| 9 | | 0.487 | (ASP) | 0.030 | | | | |
| 10 | Lens 4 | 0.254 | (ASP) | 0.353 | Plastic | 1.614 | 27.7 | 0.39 |
| 11 | | −2.274 | (ASP) | 0.300 | | | | |
| 12 | Filter | Plano | | 0.145 | Glass | 1.517 | 64.2 | — |
| 13 | | Plano | | 0.243 | | | | |
| 14 | Image | Plano | | — | | | | |

Note: Reference wavelength is 525.0 nm.

TABLE 10

Aspheric Coefficients

| Surface # | 3 | 4 | 5 | 6 |
|---|---|---|---|---|
| k = | −3.6729E+01 | −8.6698E−01 | 9.0000E+01 | 2.7682E+01 |
| A4 = | 1.6527E−01 | 2.1621E−01 | −1.4216E+00 | −3.0212E−02 |
| A6 = | −1.0659E−01 | −7.2554E−01 | 1.3397E+01 | 6.8497E+01 |
| A8 = | 4.6575E−02 | 5.9931E−01 | −5.1107E+01 | −9.5022E+02 |
| A10 = | −1.1981E−02 | −2.5028E−01 | 1.0534E+02 | 6.7862E+03 |
| A12 = | 1.5612E−03 | 5.3422E−02 | −1.1086E+02 | −2.2732E+04 |
| A14 = | −7.8372E−05 | −4.5867E−03 | 4.6013E+01 | 2.7728E+04 |

| Surface # | 8 | 9 | 10 | 11 |
|---|---|---|---|---|
| k = | −6.5280E+01 | −4.4662E+01 | −7.3331E+00 | −9.0000E+01 |
| A4 = | −6.9509E−01 | −2.2288E+01 | −1.4129E+00 | 2.2936E+00 |
| A6 = | −2.0024E+01 | 3.4416E+02 | 1.6207E+01 | −1.0133E+01 |
| A8 = | 7.0752E+02 | −4.2446E+03 | −1.3574E+02 | 1.4340E+01 |
| A10 = | −7.5057E+03 | 3.4823E+04 | 4.2383E+02 | −7.3571E+01 |
| A12 = | 3.4287E+04 | −1.8347E+05 | −5.6317E+02 | 5.0684E+02 |
| A14 = | −5.3021E+04 | 5.8999E+05 | 3.8313E+02 | −1.5528E+03 |
| A16 = | — | −1.0312E+06 | −3.3995E+02 | 2.3916E+03 |
| A18 = | — | 7.3956E+05 | 2.5568E+02 | −1.8386E+03 |
| A20 = | — | — | — | 5.6087E+02 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

5th Embodiment

| f [mm] | 0.37 | TL [mm] | 2.75 |
|---|---|---|---|
| Fno | 1.73 | SD/TD | 0.43 |
| HFOV [deg.] | 72.3 | ImgH/f | 2.64 |
| Vd4 | 27.7 | TL/ImgH | 2.81 |
| Vdmin | 27.7 | TL/f | 7.43 |
| Vd1/N1 | 36.18 | f/EPD | 1.73 |
| Vd2/N2 | 36.18 | Y12/R2 | 1.35 |
| Vd3/N3 | 36.18 | tan(HFOV)/Fno | 1.81 |
| Vd4/N4 | 17.16 | (|SAG21| + |SAG22|)/f | 0.18 |

-continued

5th Embodiment

| CT2/CT3 | 0.51 | Yc11/f | 1.94 |
|---|---|---|---|
| R1/f | −4.82 | Yc41/f | 1.16 |
| (R7 + R8)/(R7 − R8) | −0.80 | Yc42/f | 0.61; 1.12 |
| f/f2 | 0.02 | — | — |

6th Embodiment

Figure 16:
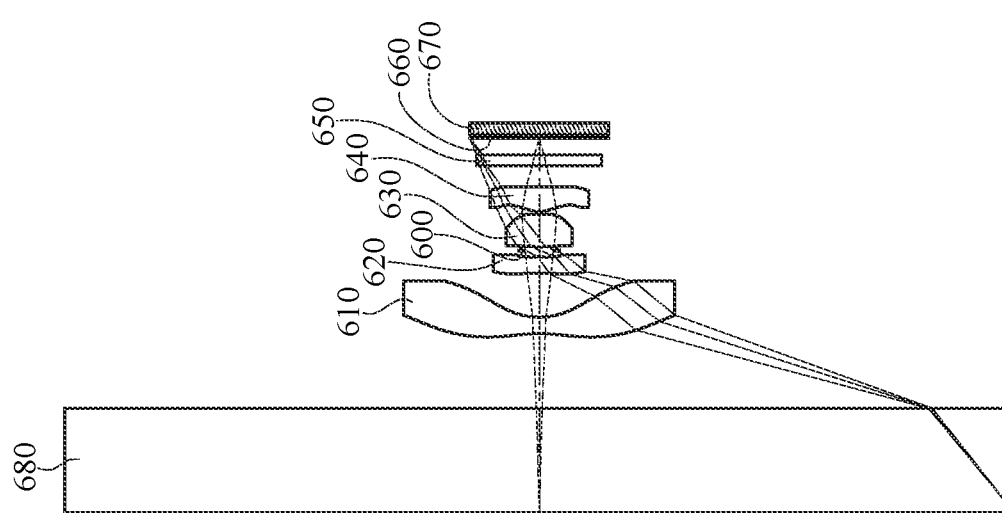
FIG. 16 is a schematic view of an identification module and a plate according to the 6th embodiment of the present disclosure.
Figure 17:
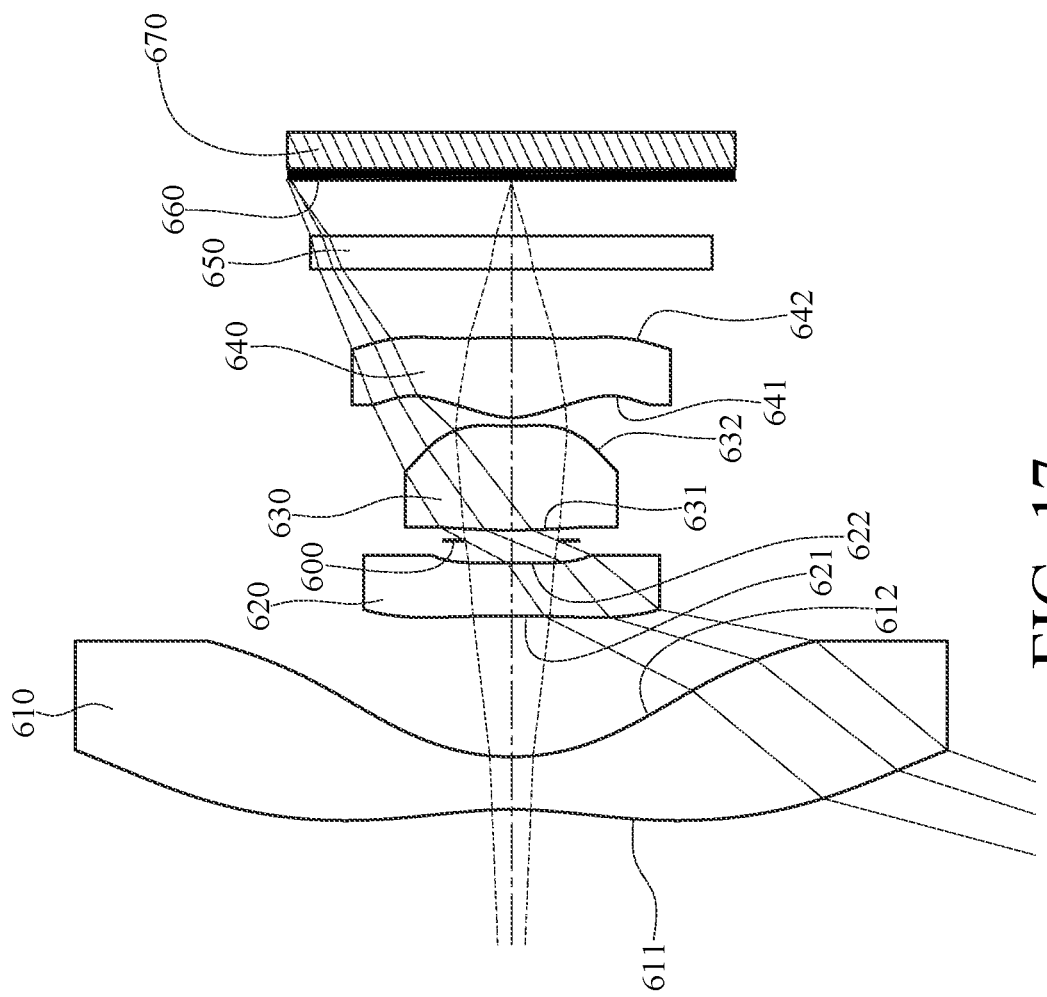
FIG. 17 is a schematic view of the identification module in FIG. 16.
Figure 18:
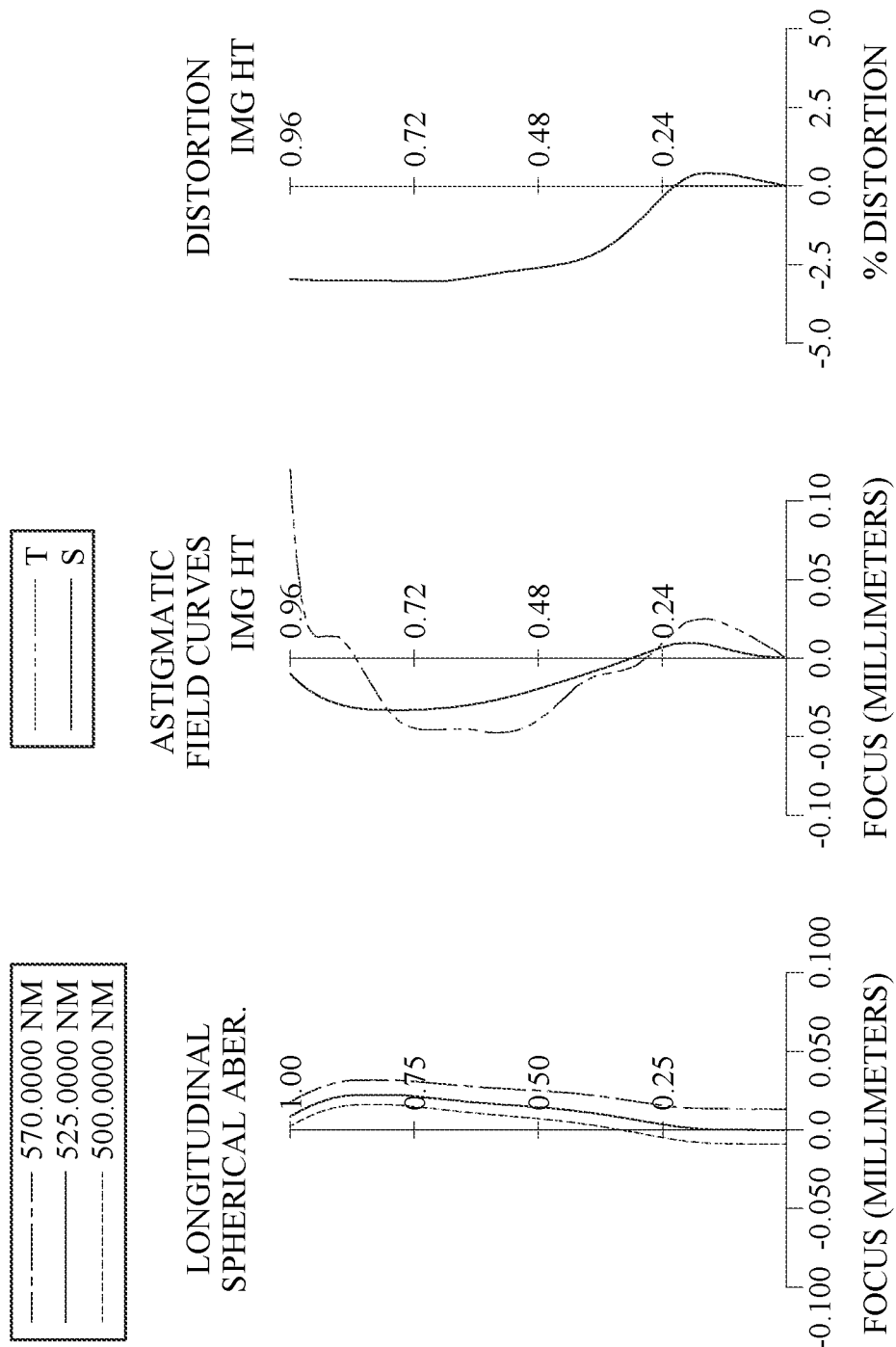
FIG. 18 shows spherical aberration curves, astigmatic field curves and a distortion curve of the identification module according to the 6th embodiment.

FIG. 16 is a schematic view of an identification module and a plate according to the 6th embodiment of the present disclosure. FIG. 17 is a schematic view of the identification module in FIG. 16. FIG. 18 shows, in order from left to right, spherical aberration curves, astigmatic field curves and a distortion curve of the identification module according to the 6th embodiment. In FIG. 16 and FIG. 17, the identification module includes the lens system (its reference numeral is omitted) of the present disclosure and an image sensor 670. The lens system includes, in order from an object side to an image side, a first lens element 610, a second lens element 620, an aperture stop 600, a third lens element 630, a fourth lens element 640, a filter 650 and an image surface 660. The lens system includes four lens elements (610, 620, 630 and 640) with no additional lens element disposed between each of the adjacent four lens elements.

The first lens element 610 with negative refractive power has an object-side surface 611 being concave in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has at least one inflection point. The image-side surface 612 of the first lens element 610 has at least one inflection point. The object-side surface 611 of the first lens element 610 has at least one convex critical point in an off-axis region thereof.

The second lens element 620 with positive refractive power has an object-side surface 621 being convex in a paraxial region thereof and an image-side surface 622 being convex in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The image-side surface 632 of the third lens element 630 has at least one convex critical point in an off-axis region thereof.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has at least one inflection point. The image-side surface 642 of the fourth lens element 640 has at least one inflection point. The object-side surface 641 of the fourth lens element 640 has at least one concave critical point in an off-axis region thereof. The image-side surface 642 of the fourth lens element 640 has at least one critical point in an off-axis region thereof. In addition, the image-side surface 642 of the fourth lens element 640 has a convex-to-concave-to-convex shape change in order from the paraxial region thereof to the off-axis region thereof.

The filter 650 is made of glass material and located between the fourth lens element 640 and the image surface 660, and will not affect the focal length of the lens system. The image sensor 670 is disposed on or near the image surface 660 of the lens system.

The plate 680 is made of glass material and located on an object side of the identification module, and will not affect the focal length of the lens system. An axial distance between the plate 680 and the first lens element 610 is 1.050 mm.

The detailed optical data of the 6th embodiment are shown in Table 11 and the aspheric surface data are shown in Table 12 below.

TABLE 11

6th Embodiment
f = 0.37 mm, Fno = 1.75, HFOV = 72.2 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Plate | Plano | | 1.465 | Glass | 1.517 | 64.2 | — |
| 2 | | Plano | | 1.050 | | | | |
| 3 | Lens 1 | −1.797 | (ASP) | 0.230 | Plastic | 1.548 | 56.0 | −1.15 |
| 4 | | 1.020 | (ASP) | 0.615 | | | | |
| 5 | Lens 2 | 58.598 | (ASP) | 0.233 | Plastic | 1.548 | 56.0 | 37.92 |
| 6 | | −32.131 | (ASP) | 0.097 | | | | |
| 7 | Ape. Stop | Plano | | 0.046 | | | | |
| 8 | Lens 3 | 2.435 | (ASP) | 0.455 | Plastic | 1.548 | 56.0 | −1.87 |
| 9 | | 0.674 | (ASP) | 0.037 | | | | |
| 10 | Lens 4 | 0.288 | (ASP) | 0.351 | Plastic | 1.623 | 26.0 | 0.44 |
| 11 | | −3.034 | (ASP) | 0.300 | | | | |
| 12 | Filter | Plano | | 0.145 | Glass | 1.517 | 64.2 | — |
| 13 | | Plano | | 0.242 | | | | |
| 14 | Image | Plano | | — | | | | |

Note: Reference wavelength is 525.0 nm.

TABLE 12

Aspheric Coefficients

| Surface # | 3 | 4 | 5 | 6 |
|---|---|---|---|---|
| k = | −3.6682E+01 | −8.6293E−01 | 9.0000E+01 | 8.6350E+01 |
| A4 = | 1.6037E−01 | 2.1426E−01 | −1.5829E+00 | −1.0422E+00 |
| A6 = | −1.0115E−01 | −7.3192E−01 | 1.5003E+01 | 1.0490E+02 |
| A8 = | 4.3622E−02 | 6.1356E−01 | −5.8377E+01 | −1.4855E+03 |
| A10 = | −1.1124E−02 | −2.5986E−01 | 1.2318E+02 | 1.0936E+04 |
| A12 = | 1.4341E−03 | 5.6113E−02 | −1.3309E+02 | −3.7735E+04 |
| A14 = | −7.0613E−05 | −4.8467E−03 | 5.6818E+01 | 4.7492E+04 |

| Surface # | 8 | 9 | 10 | 11 |
|---|---|---|---|---|
| k = | 7.4255E+00 | −8.8078E+01 | −8.5801E+00 | 7.8746E+00 |
| A4 = | −1.5875E+00 | −2.0904E+01 | −8.4213E−01 | 1.8153E+00 |
| A6 = | −8.4295E+00 | 3.2448E+02 | 1.0476E+01 | 2.9286E+00 |
| A8 = | 6.1154E+02 | −4.0558E+03 | −9.8718E+01 | −1.0801E+02 |
| A10 = | −7.6856E+03 | 3.3673E+04 | 2.7181E+02 | 6.0527E+02 |
| A12 = | 4.2362E+04 | −1.7938E+05 | −1.3958E+02 | −1.8158E+03 |
| A14 = | −1.0523E+05 | 5.8338E+05 | −4.0156E+02 | 3.3429E+03 |
| A16 = | 9.6587E+04 | −1.0316E+06 | 5.0250E+02 | −3.7497E+03 |
| A18 = | — | 7.4868E+05 | −1.2665E+02 | 2.3338E+03 |
| A20 = | — | — | — | −6.1384E+02 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

6th Embodiment

| | | | |
|---|---|---|---|
| f [mm] | 0.37 | TL [mm] | 2.75 |
| Fno | 1.75 | SD/TD | 0.43 |
| HFOV [deg.] | 72.2 | ImgH/f | 2.57 |
| Vd4 | 26.0 | TL/ImgH | 2.87 |
| Vdmin | 26.0 | TL/f | 7.37 |
| Vd1/N1 | 36.18 | f/EPD | 1.75 |
| Vd2/N2 | 36.18 | Y12/R2 | 1.39 |
| Vd3/N3 | 36.18 | tan(HFOV)/Fno | 1.82 |

-continued

| 6th Embodiment | | | |
|---|---|---|---|
| Vd4/N4 | 16.02 | (|SAG21| + |SAG22|)/f | 0.19 |
| CT2/CT3 | 0.51 | Yc11/f | 1.95 |
| R1/f | −4.81 | Yc41/f | 1.15 |
| (R7 + R8)/(R7 − R8) | −0.83 | Yc42/f | 0.61; 1.11 |
| f/f2 | 0.01 | — | — |

7th Embodiment

Figure 19:
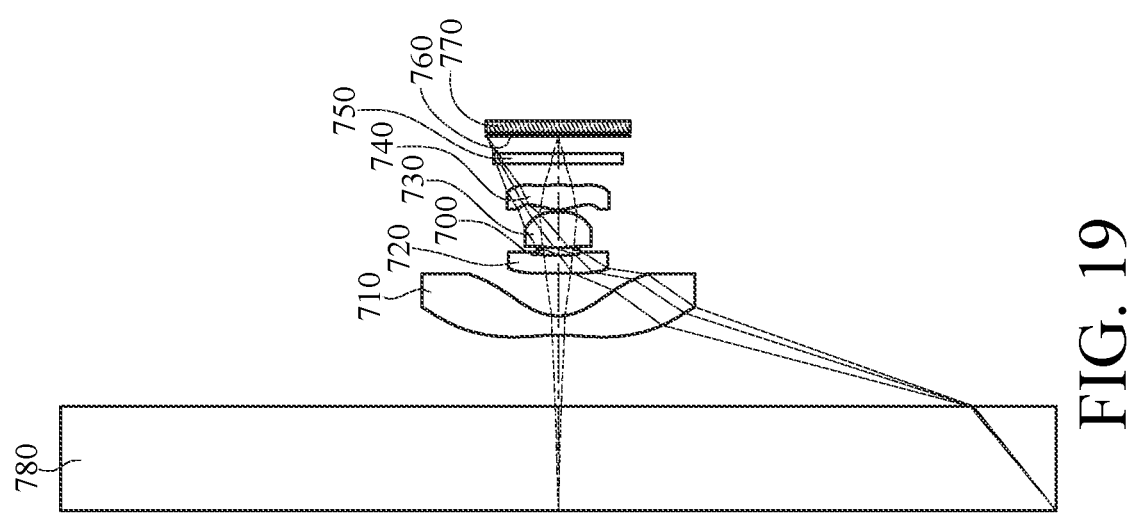
FIG. 19 is a schematic view of an identification module and a plate according to the 7th embodiment of the present disclosure.
Figure 20:
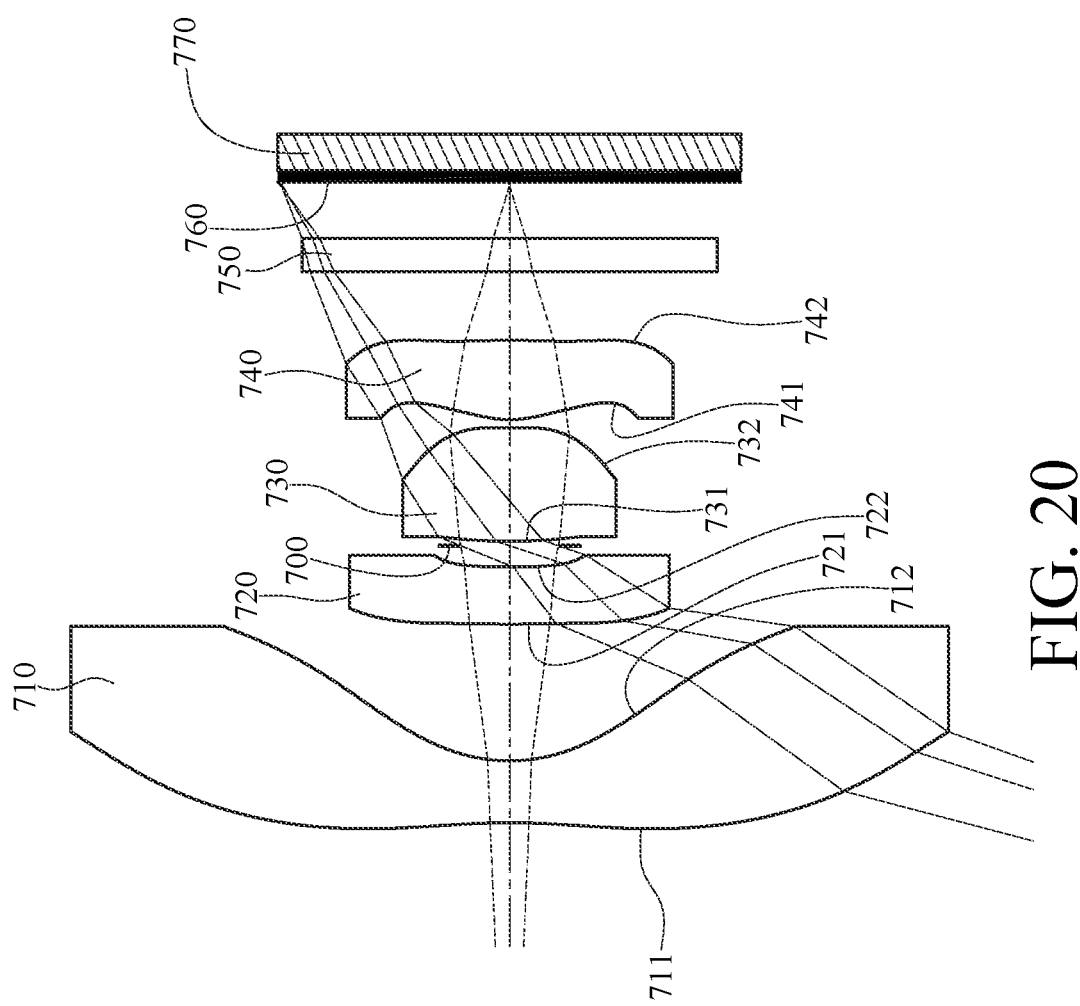
FIG. 20 is a schematic view of the identification module in FIG. 19.
Figure 21:
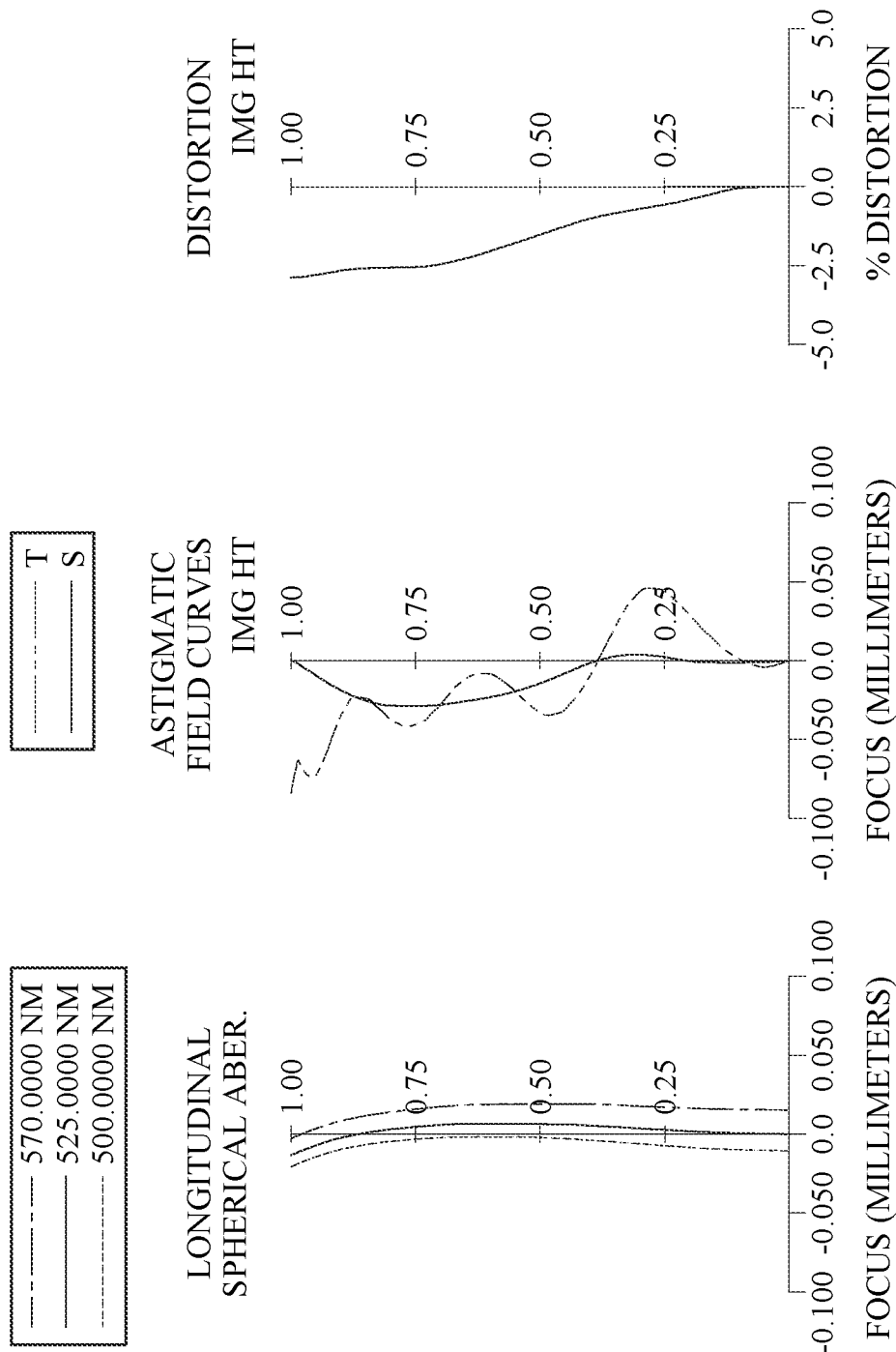
FIG. 21 shows spherical aberration curves, astigmatic field curves and a distortion curve of the identification module according to the 7th embodiment.

FIG. 19 is a schematic view of an identification module and a plate according to the 7th embodiment of the present disclosure. FIG. 20 is a schematic view of the identification module in FIG. 19. FIG. 21 shows, in order from left to right, spherical aberration curves, astigmatic field curves and a distortion curve of the identification module according to the 7th embodiment. In FIG. 19 and FIG. 20, the identification module includes the lens system (its reference numeral is omitted) of the present disclosure and an image sensor 770. The lens system includes, in order from an object side to an image side, a first lens element 710, a second lens element 720, an aperture stop 700, a third lens element 730, a fourth lens element 740, a filter 750 and an image surface 760. The lens system includes four lens elements (710, 720, 730 and 740) with no additional lens element disposed between each of the adjacent four lens elements.

The first lens element 710 with negative refractive power has an object-side surface 711 being concave in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has at least one inflection point. The image-side surface 712 of the first lens element 710 has at least one inflection point. The object-side surface 711 of the first lens element 710 has at least one convex critical point in an off-axis region thereof.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The image-side surface 732 of the third lens element 730 has at least one convex critical point in an off-axis region thereof.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric. The object-side surface 741 of the fourth lens element 740 has at least one inflection point. The image-side surface 742 of the fourth lens element 740 has at least one inflection point. The object-side surface 741 of the fourth lens element 740 has at least one concave critical point in an off-axis region thereof. The image-side surface 742 of the fourth lens element 740 has at least one critical point in an off-axis region thereof. In addition, the image-side surface 742 of the fourth lens element 740 has a convex-to-concave-to-convex shape change in order from the paraxial region thereof to the off-axis region thereof.

The filter 750 is made of glass material and located between the fourth lens element 740 and the image surface 760, and will not affect the focal length of the lens system. The image sensor 770 is disposed on or near the image surface 760 of the lens system.

The plate 780 is made of glass material and located on an object side of the identification module, and will not affect the focal length of the lens system. An axial distance between the plate 780 and the first lens element 710 is 1.000 mm.

The detailed optical data of the 7th embodiment are shown in Table 13 and the aspheric surface data are shown in Table 14 below.

TABLE 13

7th Embodiment
f = 0.37 mm, Fno = 1.70, HFOV = 72.0 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Plate | Plano | | 1.465 | Glass | 1.517 | 64.2 | — |
| 2 | | Plano | | 1.000 | | | | |
| 3 | Lens 1 | −2.530 | (ASP) | 0.270 | Plastic | 1.548 | 56.0 | −1.01 |
| 4 | | 0.738 | (ASP) | 0.598 | | | | |
| 5 | Lens 2 | 4.715 | (ASP) | 0.250 | Plastic | 1.548 | 56.0 | −30.67 |
| 6 | | 3.613 | (ASP) | 0.093 | | | | |
| 7 | Ape. Stop | Plano | | 0.019 | | | | |
| 8 | Lens 3 | 2.079 | (ASP) | 0.497 | Plastic | 1.548 | 56.0 | 6.61 |
| 9 | | 4.465 | (ASP) | 0.035 | | | | |
| 10 | Lens 4 | 0.441 | (ASP) | 0.347 | Plastic | 1.682 | 19.4 | 0.59 |
| 11 | | −3.442 | (ASP) | 0.300 | | | | |
| 12 | Filter | Plano | | 0.145 | Glass | 1.517 | 64.2 | — |
| 13 | | Plano | | 0.246 | | | | |
| 14 | Image | Plano | | — | | | | |

Note: Reference wavelength is 525.0 nm.

TABLE 14

Aspheric Coefficients

| Surface # | 3 | 4 | 5 | 6 |
|---|---|---|---|---|
| k = | −8.9853E+01 | −1.0727E+00 | −8.8904E+00 | 1.4857E+01 |
| A4 = | 1.3661E−01 | 2.0834E−01 | −1.5601E+00 | −1.1951E+00 |
| A6 = | −7.9865E−02 | −1.0025E+00 | 1.1929E+01 | 1.0819E+02 |
| A8 = | 3.3432E−02 | 9.7442E−01 | −3.8953E+01 | −1.4375E+03 |
| A10 = | −8.0930E−03 | −4.2814E−01 | 6.8881E+01 | 1.0325E+04 |
| A12 = | 1.0227E−03 | 7.3999E−02 | −6.2772E+01 | −3.1223E+04 |
| A14 = | −5.5131E−05 | −1.2846E−04 | 2.3644E+01 | 3.2193E+04 |

| Surface # | 8 | 9 | 10 | 11 |
|---|---|---|---|---|
| k = | −8.9627E+01 | −7.9270E+01 | −2.1590E+00 | 1.3881E+01 |
| A4 = | 6.5579E−01 | −1.6587E+01 | −1.0498E+01 | 1.4346E+00 |
| A6 = | −1.2779E+01 | 1.6295E+02 | 1.3490E+02 | 1.9663E+00 |
| A8 = | 2.5956E+02 | −1.1772E+03 | −1.1520E+03 | −7.3633E+01 |
| A10 = | −2.3584E+03 | 5.0866E+03 | 6.1740E+03 | 4.1537E+02 |
| A12 = | 8.1257E+03 | −1.2265E+04 | −2.0598E+04 | −1.2504E+03 |
| A14 = | −8.8409E+03 | 1.5335E+04 | 4.0067E+04 | 2.1572E+03 |
| A16 = | — | −7.7031E+03 | −4.0713E+04 | −1.9975E+03 |
| A18 = | — | — | 1.6495E+04 | 7.6689E+02 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 0.37 | TL [mm] | 2.80 |
| Fno | 1.70 | SD/TD | 0.43 |
| HFOV [deg.] | 72.0 | ImgH/f | 2.72 |
| Vd4 | 19.4 | TL/ImgH | 2.80 |
| Vdmin | 19.4 | TL/f | 7.62 |
| Vd1/N1 | 36.18 | f/EPD | 1.70 |
| Vd2/N2 | 36.18 | Y12/R2 | 1.69 |
| Vd3/N3 | 36.18 | tan(HFOV)/Fno | 1.82 |
| Vd4/N4 | 11.53 | (|SAG21| + |SAG22|)/f | 0.33 |
| CT2/CT3 | 0.50 | Yc11/f | 1.71 |
| R1/f | −6.88 | Yc41/f | 1.16 |
| (R7 + R8)/(R7 − R8) | −0.77 | Yc42/f | 0.66; 1.19 |
| f/f2 | −0.01 | — | — |

8th Embodiment

Figure 22:
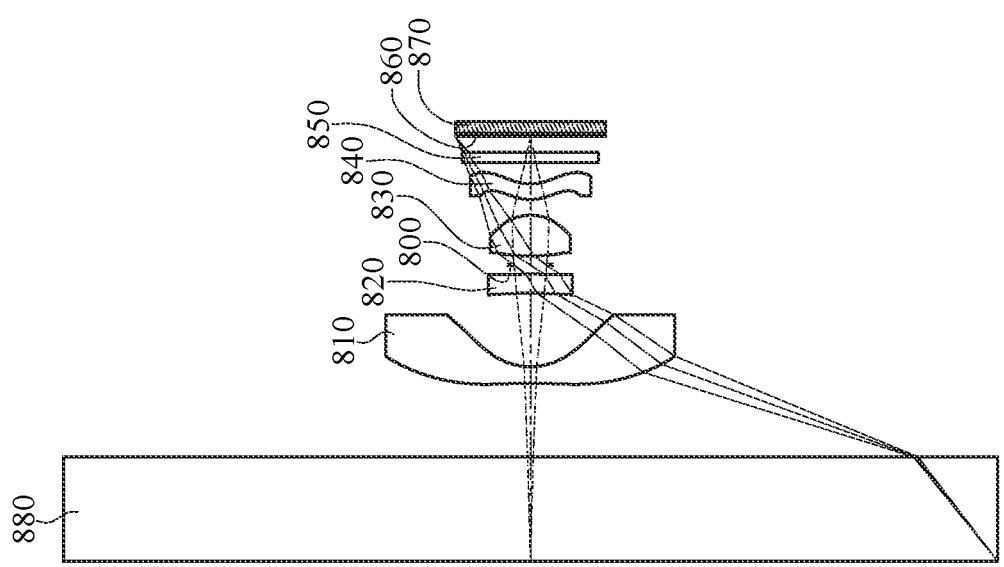
FIG. 22 is a schematic view of an identification module and a plate according to the 8th embodiment of the present disclosure.
Figure 23:
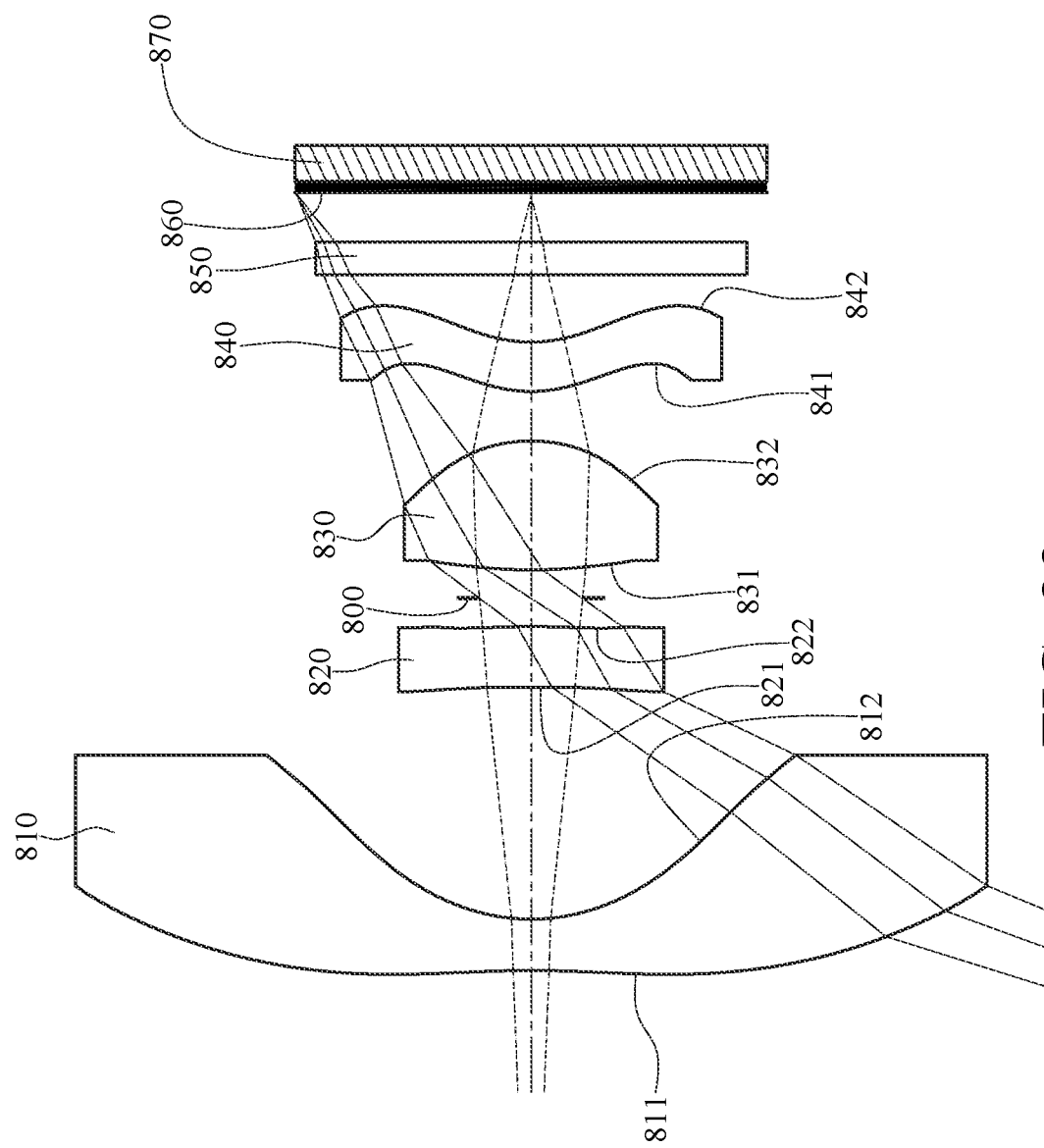
FIG. 23 is a schematic view of the identification module in FIG. 22.
Figure 24:
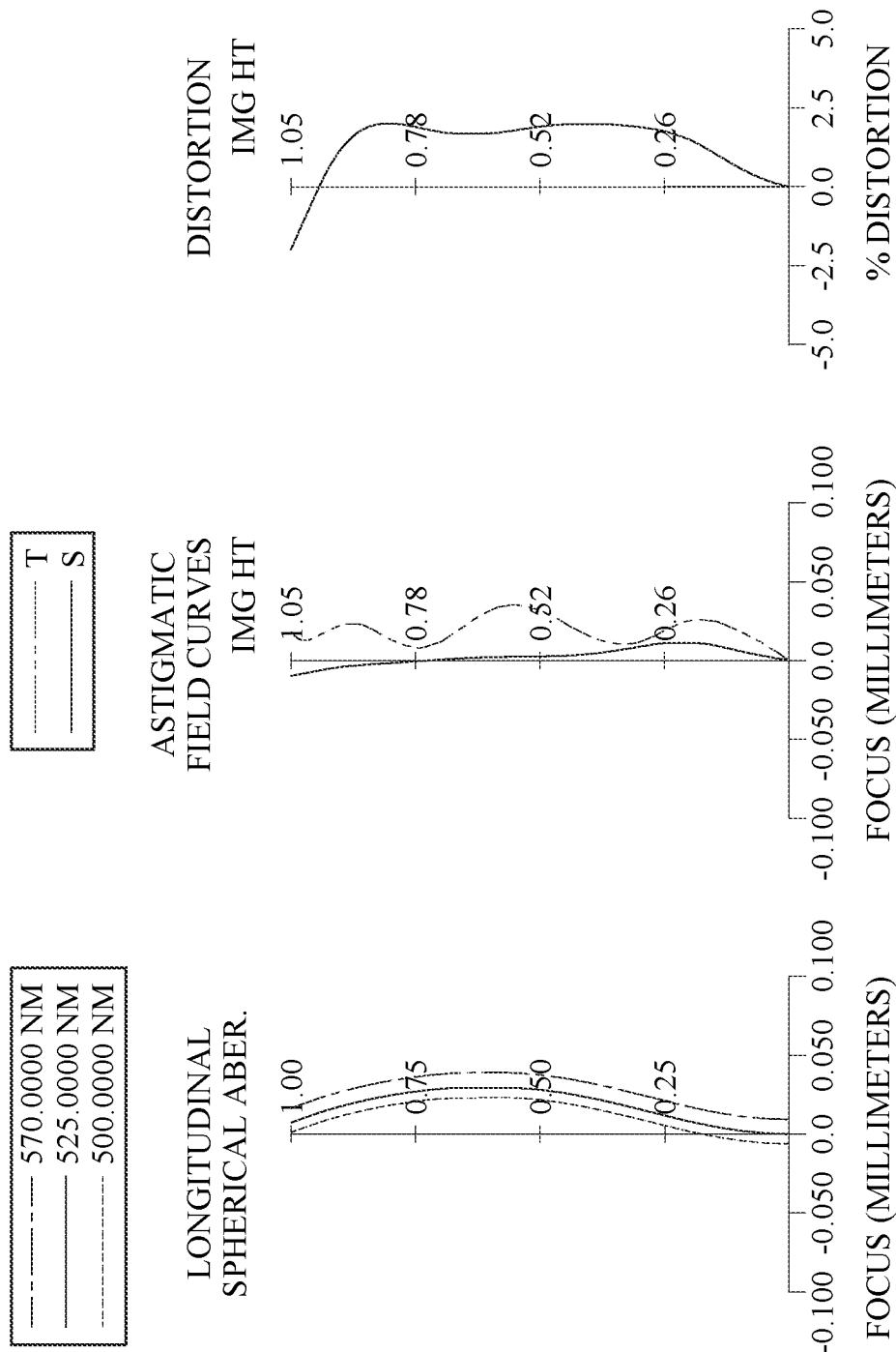
FIG. 24 shows spherical aberration curves, astigmatic field curves and a distortion curve of the identification module according to the 8th embodiment.

FIG. 22 is a schematic view of an identification module and a plate according to the 8th embodiment of the present disclosure. FIG. 23 is a schematic view of the identification module in FIG. 22. FIG. 24 shows, in order from left to right, spherical aberration curves, astigmatic field curves and a distortion curve of the identification module according to the 8th embodiment. In FIG. 22 and FIG. 23, the identification module includes the lens system (its reference numeral is omitted) of the present disclosure and an image sensor 870. The lens system includes, in order from an object side to an image side, a first lens element 810, a second lens element 820, an aperture stop 800, a third lens element 830, a fourth lens element 840, a filter 850 and an image surface 860. The lens system includes four lens elements (810, 820, 830 and 840) with no additional lens element disposed between each of the adjacent four lens elements.

The first lens element 810 with negative refractive power has an object-side surface 811 being concave in a paraxial region thereof and an image-side surface 812 being concave in a paraxial region thereof. The first lens element 810 is made of plastic material and has the object-side surface 811 and the image-side surface 812 being both aspheric. The object-side surface 811 of the first lens element 810 has at least one inflection point. The image-side surface 812 of the first lens element 810 has at least one inflection point. The object-side surface 811 of the first lens element 810 has at least one convex critical point in an off-axis region thereof.

The second lens element 820 with positive refractive power has an object-side surface 821 being concave in a paraxial region thereof and an image-side surface 822 being convex in a paraxial region thereof. The second lens element 820 is made of plastic material and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The object-side surface 841 of the fourth lens element 840 has at least one inflection point. The image-side surface 842 of the fourth lens element 840 has at least one inflection point. The object-side surface 841 of the fourth lens element 840 has at least one concave critical point in an off-axis region thereof. The image-side surface 842 of the fourth lens element 840 has at least one critical point in an off-axis region thereof.

The filter 850 is made of glass material and located between the fourth lens element 840 and the image surface 860, and will not affect the focal length of the lens system. The image sensor 870 is disposed on or near the image surface 860 of the lens system.

The plate 880 is made of glass material and located on an object side of the identification module, and will not affect the focal length of the lens system. An axial distance between the plate 880 and the first lens element 810 is 1.039 mm.

The detailed optical data of the 8th embodiment are shown in Table 15 and the aspheric surface data are shown in Table 16 below.

TABLE 15

8th Embodiment
f = 0.43 mm, Fno = 2.02, HFOV = 69.9 deg.

| Surface # | | Curvature Radius | | Thickness | Material | Index | Abbe # | Focal Length |
|---|---|---|---|---|---|---|---|---|
| 0 | Object | Plano | | 0.000 | | | | |
| 1 | Plate | Plano | | 1.465 | Glass | 1.517 | 64.2 | — |
| 2 | | Plano | | 1.039 | | | | |
| 3 | Lens 1 | −4.767 | (ASP) | 0.229 | Plastic | 1.548 | 56.0 | −1.31 |
| 4 | | 0.859 | (ASP) | 1.035 | | | | |
| 5 | Lens 2 | −16.699 | (ASP) | 0.269 | Plastic | 1.649 | 23.5 | 8.49 |
| 6 | | −4.170 | (ASP) | 0.126 | | | | |
| 7 | Ape. Stop | Plano | | 0.127 | | | | |
| 8 | Lens 3 | 1.909 | (ASP) | 0.574 | Plastic | 1.548 | 56.0 | 1.00 |
| 9 | | −0.691 | (ASP) | 0.221 | | | | |
| 10 | Lens 4 | 0.610 | (ASP) | 0.220 | Plastic | 1.705 | 17.0 | 4.31 |
| 11 | | 0.649 | (ASP) | 0.300 | | | | |
| 12 | Filter | Plano | | 0.145 | Glass | 1.517 | 64.2 | — |
| 13 | | Plano | | 0.221 | | | | |
| 14 | Image | Plano | | — | | | | |

Note: Reference wavelength is 525.0 nm.

TABLE 16

Aspheric Coefficients

| Surface # | 3 | 4 | 5 | 6 |
|---|---|---|---|---|
| k = | −7.0457E+01 | −8.3912E−01 | 9.0000E+01 | 7.4420E+01 |
| A4 = | 1.3030E−01 | −7.6617E−02 | −7.3143E−01 | 2.2897E−01 |
| A6 = | −8.0761E−02 | 3.9883E−01 | 4.2453E+00 | 1.0641E+01 |
| A8 = | 3.3374E−02 | −4.2531E−01 | −1.3516E+01 | −1.1945E+02 |
| A10 = | −8.1109E−03 | −1.0749E−01 | 3.2061E+01 | 9.0049E+02 |
| A12 = | 1.0285E−03 | 2.4456E−01 | −4.7654E+01 | −3.5135E+03 |
| A14 = | −5.0584E−05 | −6.8813E−02 | 2.9058E+01 | 5.3541E+03 |

| Surface # | 8 | 9 | 10 | 11 |
|---|---|---|---|---|
| k = | −7.0572E+01 | −1.8152E+01 | −1.7304E+00 | −2.7680E+00 |
| A4 = | 2.3469E−01 | −6.4238E+00 | −6.3220E−01 | 8.5102E−01 |
| A6 = | −1.6198E−01 | 4.9050E+01 | −3.3728E+00 | −1.2106E+01 |
| A8 = | −1.4523E+01 | −3.0635E+02 | 1.5473E+01 | 5.2403E+01 |
| A10 = | 1.2536E+02 | 1.3075E+03 | −7.4374E+01 | −1.3772E+02 |
| A12 = | −3.3566E+02 | −3.4715E+03 | 3.2435E+02 | 2.3231E+02 |
| A14 = | 3.2263E+02 | 5.0194E+03 | −8.9229E+02 | −2.4800E+02 |
| A16 = | — | −2.7876E+03 | 1.2409E+03 | 1.5266E+02 |
| A18 = | — | — | −6.6180E+02 | −4.1048E+01 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 0.43 | TL [mm] | 3.47 |
| Fno | 2.02 | SD/TD | 0.41 |
| HFOV [deg.] | 69.9 | ImgH/f | 2.44 |
| Vd4 | 17.0 | TL/ImgH | 3.30 |
| Vdmin | 17.0 | TL/f | 8.04 |
| Vd1/N1 | 36.18 | f/EPD | 2.02 |
| Vd2/N2 | 14.25 | Y12/R2 | 1.37 |
| Vd3/N3 | 36.18 | tan(HFOV)/Fno | 1.36 |
| Vd4/N4 | 9.97 | (|SAG21| + |SAG22|)/f | 0.06 |
| CT2/CT3 | 0.47 | Yc11/f | 1.44 |
| R1/f | −11.05 | Yc41/f | 1.25 |
| (R7 + R8)/(R7 − R8) | −32.17 | Yc42/f | 1.53 |
| f/f2 | 0.05 | — | — |

9th Embodiment

Figure 25:
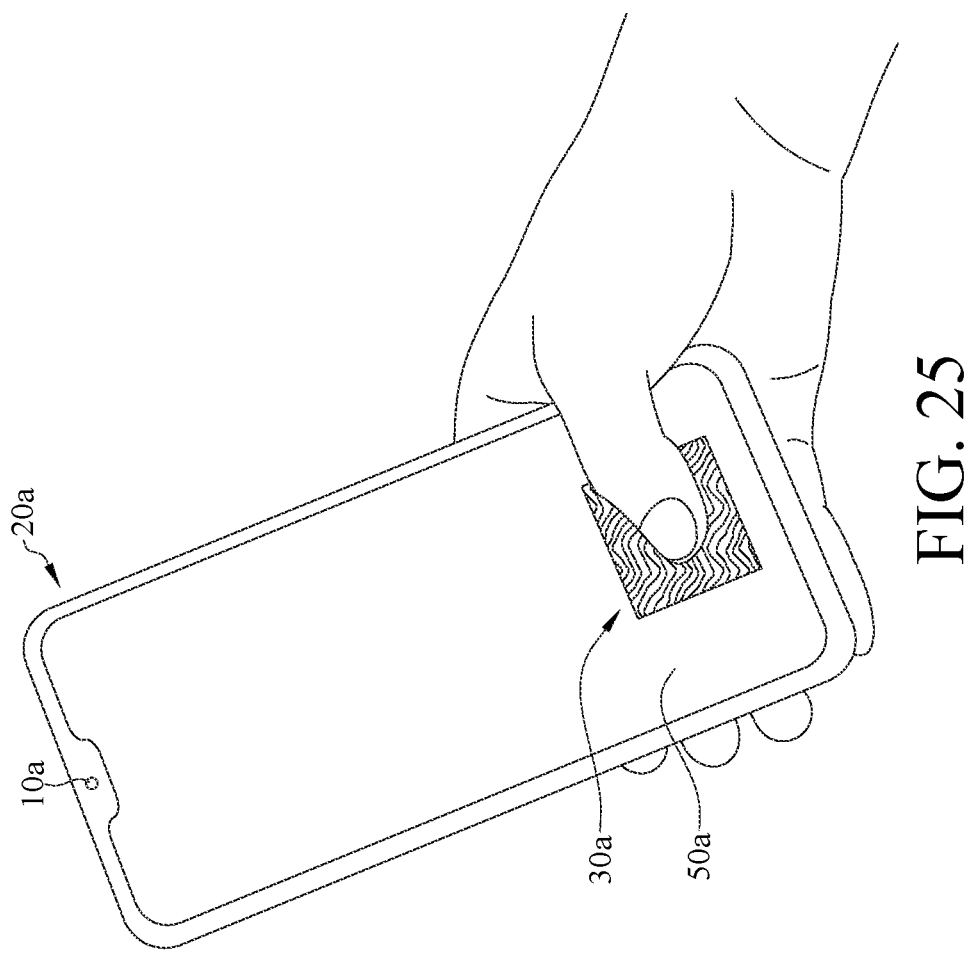
FIG. 25 is a schematic view of an electronic device according to the 9th embodiment of the present disclosure.
Figure 26:
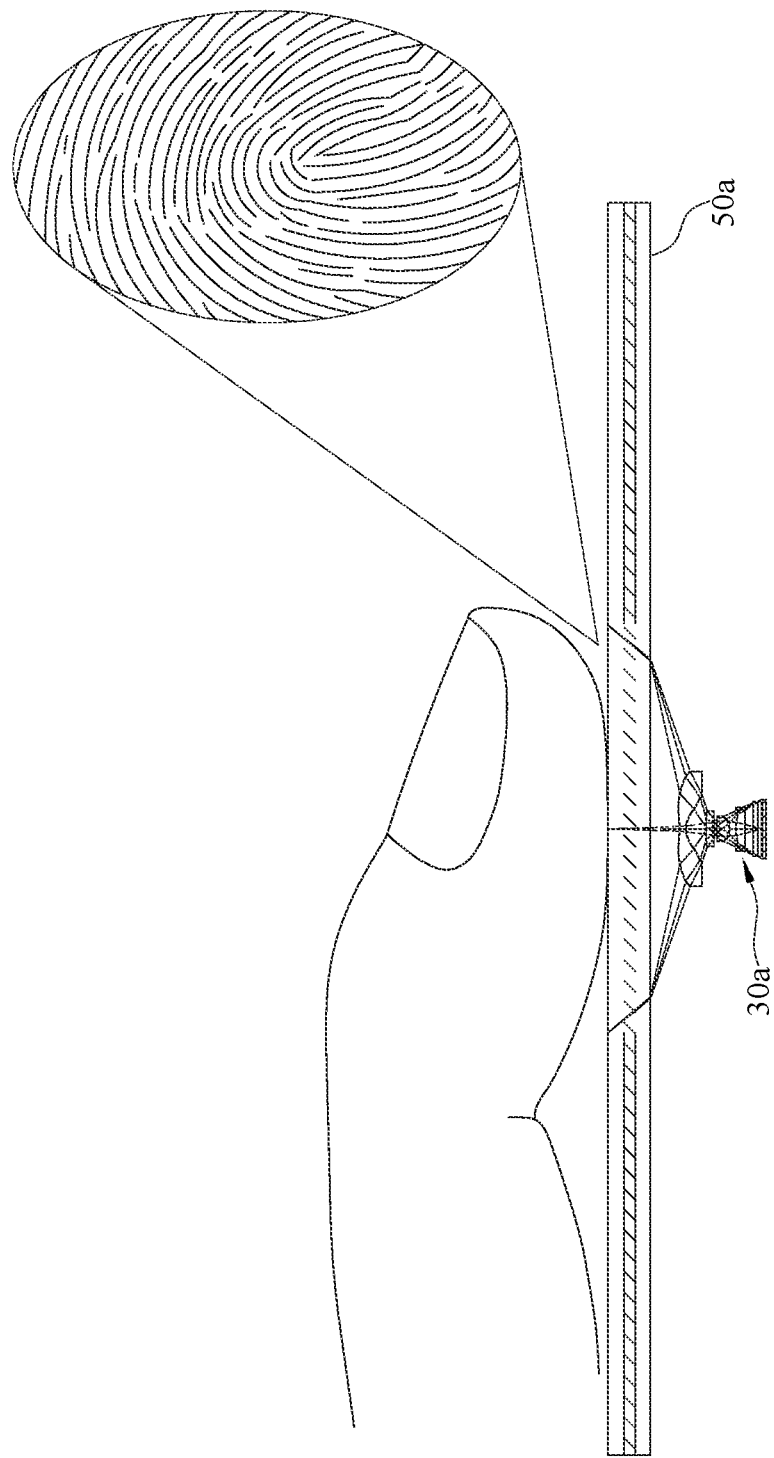
FIG. 26 is a schematic view of the electronic device in FIG. 25 identifying a fingerprint.

FIG. 25 is a schematic view of an electronic device according to the 9th embodiment of the present disclosure. FIG. 26 is a schematic view of the electronic device in FIG. 25 identifying a fingerprint.

In this embodiment, an electronic device 20a is a smartphone having a biometric identification function. The electronic device 20a includes an image capturing unit 10a, an identification module 30a and a plate 50a. The image capturing unit 10a is a front-facing camera of the electronic device 20a for taking selfies, and the image capturing unit 10a includes the lens system of the present disclosure and an image sensor. The identification module 30a has a fingerprint identification function, and the identification module 30a includes the lens system disclosed in the 1st embodiment and an image sensor, but the present disclosure is not limited thereto. In some other embodiments, the identification module may include the lens system disclosed in another embodiment. In this embodiment, each of the image capturing unit 10a and the identification module 30a includes the lens system of the present disclosure, but the present disclosure is not limited thereto. For example, in some configurations, only one of the image capturing unit 10a and the identification module 30a includes the lens system of the present disclosure.

The plate 50a is disposed on an object side of the identification module 30a, and the plate 50a is a module having a display function. Therefore, the plate 50a provides protection to the device and also helps reducing the use of components. Furthermore, the plate 50a can be a light-permeable plate, so light rays can travel through the plate 50a into the lens system of the identification module 30a for wider applications. Moreover, the plate 50a can have a touch-screen function, such that there is no need of additional input devices, and it's favorable for making the operation more intuitive. Additionally, the plate 50a can have a light-emitting function, which may include an organic light-emitting diode (OLED) display layer or an active-matrix organic light-emitting diode (AMOLED) display layer, such that the plate 50a can be a light source for illuminating an imaged object, thereby saving additional light sources.

10th Embodiment

Figure 27:
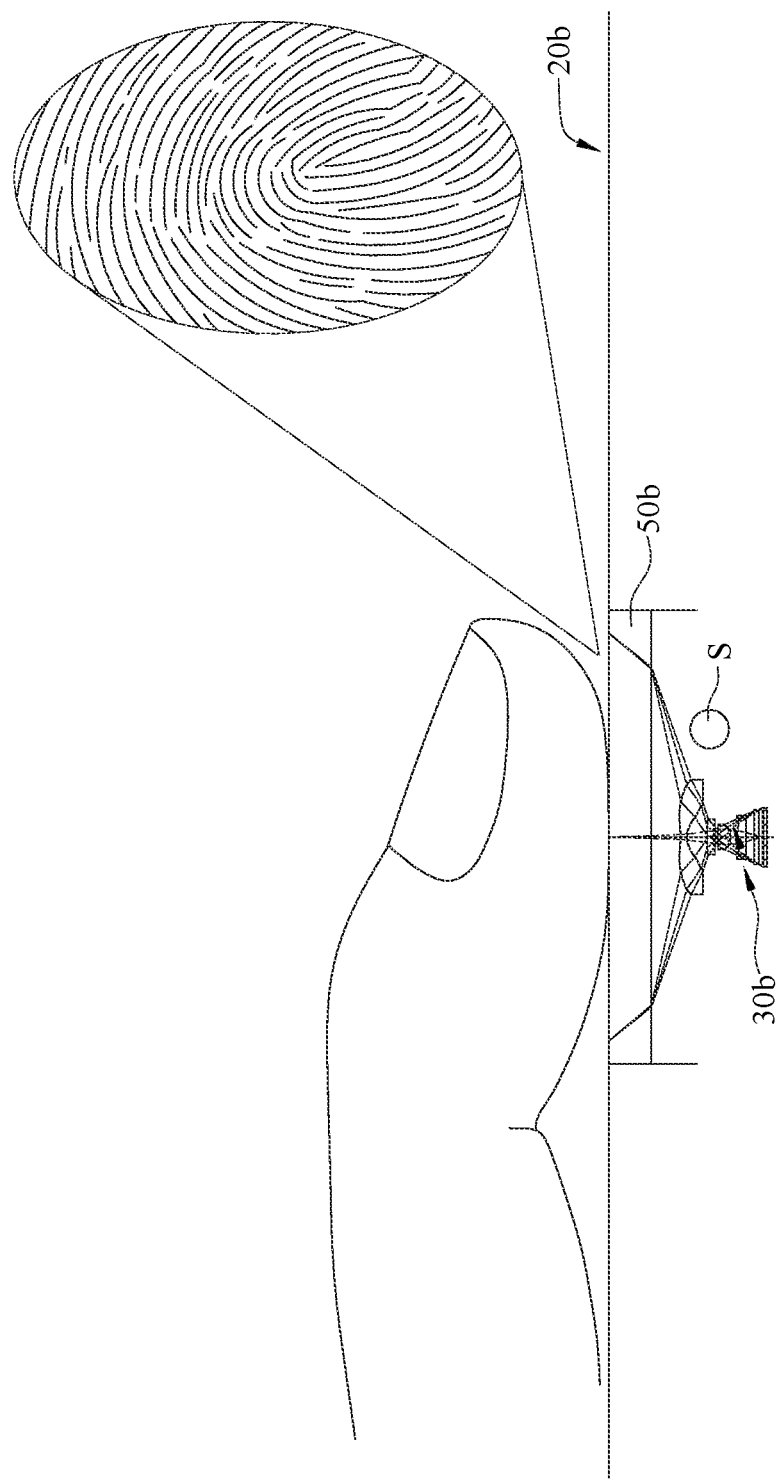
FIG. 27 is a schematic view of an electronic device according to the 10th embodiment of the present disclosure identifying a fingerprint.

FIG. 27 is a schematic view of an electronic device according to the 10th embodiment of the present disclosure identifying a fingerprint. In this embodiment, an electronic device 20b is a smartphone having a biometric identification function. The electronic device 20b includes an identification module 30b, a light source S and a plate 50b. The identification module 30b has a fingerprint identification function, and the identification module 30b includes the lens system disclosed in the 1st embodiment and an image sensor, but the present disclosure is not limited thereto. In some other embodiments, the identification module may include the lens system disclosed in another embodiment. The plate 50b is disposed on an object side of the identification module 30b, and the plate 50b is, for example, a light-permeable glass substrate. The light source S is disposed on one side of the lens system for illuminating an imaged object, such that light rays from the imaged object can travel through the plate 50b into the lens system of the identification module 30b. In this embodiment, the identification module 30b is the identification module disclosed in the 1st embodiment, but the present disclosure is not limited thereto.

The plate being a module having a display function or a glass substrate in the above embodiments is only exemplary, and the present disclosure is not limited thereto. In other embodiments, the plate can be, for example, a filter.

According to the present disclosure, the lens system of the identification module features good capability in aberration corrections and high image quality, and the identification module can be applied to smartphones for under-display fingerprint identification, but the present disclosure is not limited thereto. For example, the identification module can be applied to other biometric identification applications such as iris and face identifications.

11th Embodiment

Figure 28:
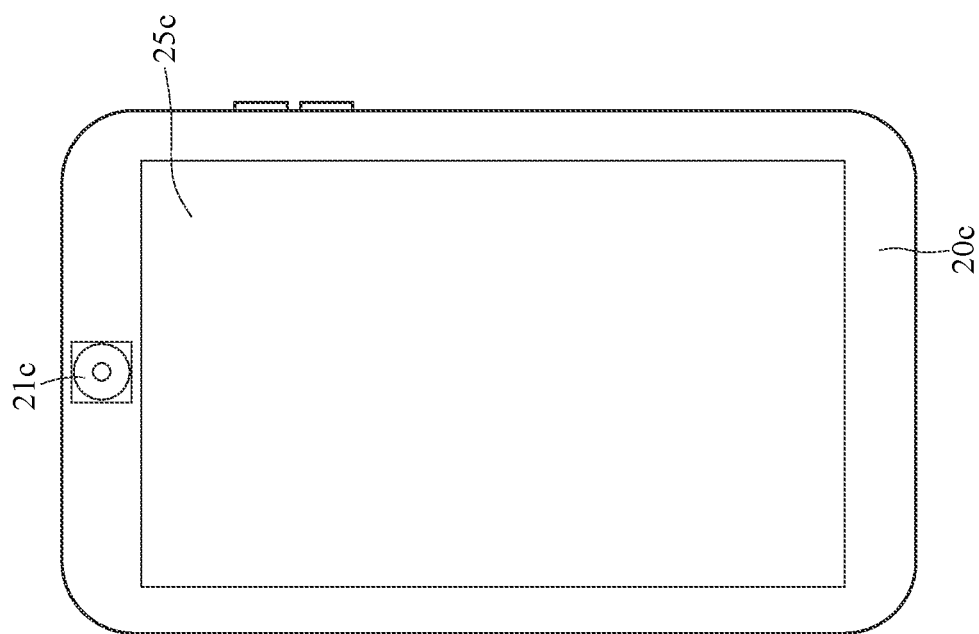
FIG. 28 is a front view of an electronic device according to the 11th embodiment of the present disclosure.
Figure 29:
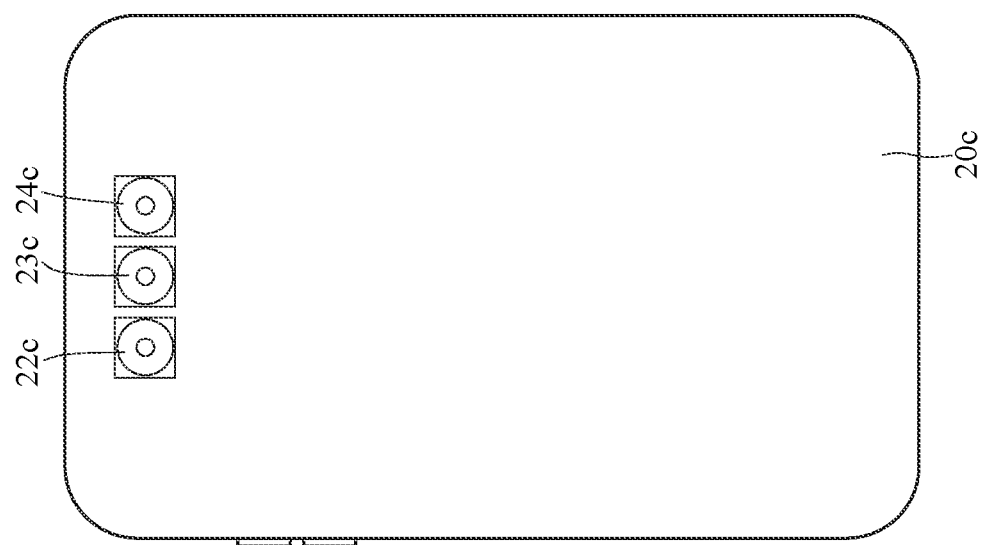
FIG. 29 is a rear view of the electronic device in FIG. 28.

FIG. 28 is a front view of an electronic device according to the 11th embodiment of the present disclosure. FIG. 29 is a rear view of the electronic device in FIG. 28.

In this embodiment, an electronic device 20c is a smartphone including an image capturing unit 21c, an image capturing unit 22c, an image capturing unit 23c, an image capturing unit 24c and a display unit 25c. The image capturing unit 21c includes the lens system disclosed in the 1st embodiment and an image sensor, but the present disclosure is not limited thereto. The image capturing unit may include the lens system disclosed in another embodiment of the present disclosure.

The image capturing units 22c, 23c and 24c have different fields of view. In detail, the image capturing unit 22c is a telephoto image capturing unit, the image capturing unit 23c is a wide-angle image capturing unit and the image capturing unit 24c is an ultra-wide-angle image capturing unit. As such, the electronic device 20c has various magnification ratios so as to meet the requirement of optical zoom functionality for various applications with different requirements.

In this embodiment, the image capturing units 22c, 23c and 24c are all disposed on one side of the electronic device 20c, while the image capturing unit 21c and display unit 25c are disposed on the opposite side of the electronic device 20c. The image capturing unit 21c is a front-facing camera of the electronic device 20c for taking selfies, but the present disclosure is not limited thereto.

The lens system of the present disclosure can be installed in various electronic devices and can be applicable to applications such as image capturing and image identification. For example, the lens system can be applied to biometric identification and 3 D (three-dimensional) image capturing applications, in products such as digital cameras, mobile devices, digital tablets, smart televisions, network surveillance devices, dashboard cameras, vehicle backup cameras, multi-camera devices, motion sensing input devices, wearable devices and other electronic imaging devices.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A lens system comprising four lens elements, the four lens elements being, in order from an object side to an image side, a first lens element, a second lens element, a third lens element and a fourth lens element, and each of the four lens elements having an object-side surface facing toward the object side and an image-side surface facing toward the image side;

wherein the first lens element has negative refractive power, the object-side surface of the first lens element is concave in a paraxial region thereof, the object-side surface of the first lens element has at least one inflection point, the second lens element has positive refractive power, the object-side surface of the second lens element is concave in a paraxial region thereof, the lens system further comprises an aperture stop disposed between the second lens element and the third lens element, and a total number of lens elements in the lens system is four;

wherein a minimum value among Abbe numbers of all lens elements of the lens system is Vdmin, a curvature radius of the object-side surface of the first lens element is R1, a focal length of the lens system is f, an entrance pupil diameter of the lens system is EPD, and the following conditions are satisfied:

13.0<Vdmin<21.0;
−12.0<R1/f<0; and
1.25<f/EPD<2.50.

2. The lens system of claim 1, wherein the third lens element has positive refractive power, the object-side surface of the third lens element is convex in a paraxial region thereof, and the image-side surface of the third lens element is convex in a paraxial region thereof.

3. The lens system of claim 1, wherein the image-side surface of the fourth lens element is concave in a paraxial region thereof.

4. The lens system of claim 1, wherein the minimum value among Abbe numbers of all lens elements of the lens system is Vdmin, and the following condition is satisfied:
13.0<Vdmin≤19.4.

5. The lens system of claim 1, wherein an Abbe number of the fourth lens element is Vd4, and the following condition is satisfied:
10.0<Vd4<38.0.

6. The lens system of claim 5, wherein the Abbe number of the fourth lens element is Vd4, and the following condition is satisfied:
13.0<Vd4<30.0.

7. The lens system of claim 1, wherein a vertical distance between a non-axial critical point on the object-side surface of the first lens element and an optical axis is Yc11, the focal length of the lens system is f, and the object-side surface of the first lens element has at least one critical point in an off-axis region thereof satisfying the following condition:
0.50<Yc11/f<5.0.

8. The lens system of claim 7, wherein the vertical distance between the non-axial critical point on the object-side surface of the first lens element and the optical axis is Yc11, the focal length of the lens system is f, and the object-side surface of the first lens element has at least one critical point in the off-axis region thereof satisfying the following condition:
0.80<Yc11/f<3.0.

9. The lens system of claim 1, wherein the curvature radius of the object-side surface of the first lens element is R1, the focal length of the lens system is f, and the following condition is satisfied:
−8.0<R1/f<−2.0.

10. The lens system of claim 1, wherein the curvature radius of the object-side surface of the first lens element is R1, the focal length of the lens system is f, and the following condition is satisfied:
−5.99≤R1/f<0.

11. The lens system of claim 1, wherein a curvature radius of the object-side surface of the fourth lens element is R7, a curvature radius of the image-side surface of the fourth lens element is R8, and the following condition is satisfied:
−1.80<(R7+R8)/(R7−R8)<0.50.

12. The lens system of claim 1, wherein an axial distance between the object-side surface of the first lens element and an image surface is TL, and the following condition is satisfied:
1.0 mm<TL<3.0 mm;
wherein an Abbe number of the first lens element is Vd1, an Abbe number of the second lens element is Vd2, an Abbe number of the third lens element is Vd3, an Abbe number of the fourth lens element is Vd4, an Abbe number of the i-th lens element is Vdi, a refractive index of the first lens element is N1, a refractive index of the second lens element is N2, a refractive index of the third lens element is N3, a refractive index of the fourth lens element is N4, a refractive index of the i-th lens element is Ni, and at least one lens element of the lens system satisfies the following condition:
Vdi/Ni<13.5, wherein i=1, 2, 3 or 4.

13. A lens system comprising four lens elements, the four lens elements being, in order from an object side to an image side, a first lens element, a second lens element, a third lens element and a fourth lens element, and each of the four lens elements having an object-side surface facing toward the object side and an image-side surface facing toward the image side;
wherein the object-side surface of the first lens element is concave in a paraxial region thereof, the object-side surface of the first lens element has at least one inflection point, the second lens element has positive refractive power, the object-side surface of the second lens element is concave in a paraxial region thereof, a central thickness of the second lens element is larger than a central thickness of the fourth lens element, and a total number of lens elements in the lens system is four;
wherein a minimum value among Abbe numbers of all lens elements of the lens system is Vdmin, a curvature radius of the object-side surface of the first lens element is R1, a focal length of the lens system is f, an entrance pupil diameter of the lens system is EPD, an axial distance between the object-side surface of the first lens element and an image surface is TL, and the following conditions are satisfied:
13.0<Vdmin<21.0;
−12.0<R1/f<0;
1.25<f/EPD<2.50; and
4.85<TL/f<15.0.

14. The lens system of claim 13, wherein the first lens element has negative refractive power, the image-side surface of the first lens element is concave in a paraxial region thereof, and the image-side surface of the second lens element is convex in a paraxial region thereof.

15. The lens system of claim 13, wherein the object-side surface of the first lens element has at least one convex critical point in an off-axis region thereof.

16. The lens system of claim 13, wherein the axial distance between the object-side surface of the first lens element and the image surface is TL, the focal length of the lens system is f, and the following condition is satisfied:
5.50<TL/f<12.0.

17. The lens system of claim 16, wherein the axial distance between the object-side surface of the first lens element and the image surface is TL, the focal length of the lens system is f, and the following condition is satisfied:
5.50<TL/f≤8.04.

18. The lens system of claim 13, wherein a curvature radius of the object-side surface of the fourth lens element is R7, a curvature radius of the image-side surface of the fourth lens element is R8, and the following condition is satisfied:
−50.0<(R7+R8)/(R7−R8)<0.25.

19. The lens system of claim 13, wherein a displacement in parallel with an optical axis from an axial vertex to a maximum effective radius position on the object-side surface of the second lens element is SAG21, a displacement in parallel with the optical axis from an axial vertex to a maximum effective radius position on the image-side surface of the second lens element is SAG22, the focal length of the lens system is f, and the following condition is satisfied:
0≤(|SAG21|+|SAG22|)/f<0.50.

20. The lens system of claim 19, wherein the displacement in parallel with the optical axis from the axial vertex to the maximum effective radius position on the object-side surface of the second lens element is SAG21, the displacement in parallel with the optical axis from the axial vertex to the maximum effective radius position on the image-side surface of the second lens element is SAG22, the focal length of the lens system is f, and the following condition is satisfied:

0≤(|SAG21|+|SAG22|)/f<0.35.

21. The lens system of claim 13, wherein an Abbe number of the first lens element is Vd1, an Abbe number of the second lens element is Vd2, an Abbe number of the third lens element is Vd3, an Abbe number of the fourth lens element is Vd4, an Abbe number of the i-th lens element is Vdi, a refractive index of the first lens element is N1, a refractive index of the second lens element is N2, a refractive index of the third lens element is N3, a refractive index of the fourth lens element is N4, a refractive index of the i-th lens element is Ni, and at least one lens element of the lens system satisfies the following condition:

Vdi/Ni<13.5, wherein i=1, 2, 3 or 4.

22. The lens system of claim 21, wherein the Abbe number of the first lens element is Vd1, the Abbe number of the second lens element is Vd2, the Abbe number of the third lens element is Vd3, the Abbe number of the fourth lens element is Vd4, the Abbe number of the i-th lens element is Vdi, the refractive index of the first lens element is N1, the refractive index of the second lens element is N2, the refractive index of the third lens element is N3, the refractive index of the fourth lens element is N4, the refractive index of the i-th lens element is Ni, and at least one lens element of the lens system satisfies the following condition:

Vdi/Ni<12.0, wherein i=1, 2, 3 or 4.

23. The lens system of claim 13, further comprising an aperture stop, wherein an axial distance between the aperture stop and the image-side surface of the fourth lens element is SD, an axial distance between the object-side surface of the first lens element and the image-side surface of the fourth lens element is TD, and the following condition is satisfied:

0.40<SD/TD<0.95.

* * * * *